US011060558B2

(12) United States Patent
Chen et al.

(10) Patent No.: US 11,060,558 B2
(45) Date of Patent: Jul. 13, 2021

(54) SLIDE RAIL ASSEMBLY AND OPERATION METHOD THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Tzu-Cheng Weng, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 16/690,366

(22) Filed: Nov. 21, 2019

(65) Prior Publication Data
US 2020/0392990 A1 Dec. 17, 2020

(30) Foreign Application Priority Data

Jun. 12, 2019 (TW) ................................ 108120604

(51) Int. Cl.
A47B 88/40 (2017.01)
F16C 29/04 (2006.01)
A47B 88/49 (2017.01)
A47B 88/493 (2017.01)

(52) U.S. Cl.
CPC .............. F16C 29/04 (2013.01); A47B 88/49 (2017.01); A47B 88/493 (2017.01); A47B 2210/0008 (2013.01); A47B 2210/0016 (2013.01)

(58) Field of Classification Search
CPC ......... F16C 29/04; A47B 88/40; A47B 88/44; A47B 88/443; A47B 88/45; A47B 88/49
USPC .......... 312/330.1, 333, 334.1, 334.8, 334.44, 312/334.46, 334, 47
See application file for complete search history.

(56) References Cited

U.S. PATENT DOCUMENTS 4,560,212 A * 12/1985 Papp ..................... A47B 88/493
312/334.47
6,450,600 B1 * 9/2002 Chen ..................... A47B 88/493
312/333
6,705,689 B2 * 3/2004 Chen ..................... A47B 88/493
312/333

(Continued)

FOREIGN PATENT DOCUMENTS

EP 3550945 A1 10/2019

OTHER PUBLICATIONS

International Search Report Issued by a Foreign Patent Office.

Primary Examiner — James O Hansen
(74) Attorney, Agent, or Firm — . Rosenberg, Klein & Lee

(57) ABSTRACT

A slide rail assembly includes a first rail, a second rail, a third rail, and a switching member. The second rail can be displaced with respect to the first rail and is provided with a working feature. The third rail can be displaced with respect to the second rail. The switching member is disposed on the third rail and is configured to contact the working feature when the third rail reaches a predetermined retracted position after being displaced from an extended position in a retracting direction, in order for the third rail to displace the second rail to a predetermined position in the retracting direction via the switching member.

16 Claims, 18 Drawing Sheets

(56) References Cited

U.S. PATENT DOCUMENTS

| | | | | |
|---|---|---|---|---|
| 6,817,685 | B2* | 11/2004 | Lammens | A47B 88/493 312/333 |
| 8,317,278 | B2* | 11/2012 | Enos | A47B 88/493 312/333 |
| 9,629,459 | B2 | 4/2017 | Chen et al. | |
| 9,681,749 | B2 | 6/2017 | Chen et al. | |
| 9,992,906 | B2 | 6/2018 | Chen et al. | |
| 2009/0195133 | A1* | 8/2009 | Chang | A47B 88/57 312/334.46 |
| 2012/0308297 | A1 | 12/2012 | Chen et al. | |
| 2015/0091424 | A1* | 4/2015 | Nuckolls | A47B 88/433 312/319.1 |
| 2016/0060934 | A1 | 3/2016 | Chen et al. | |

* cited by examiner

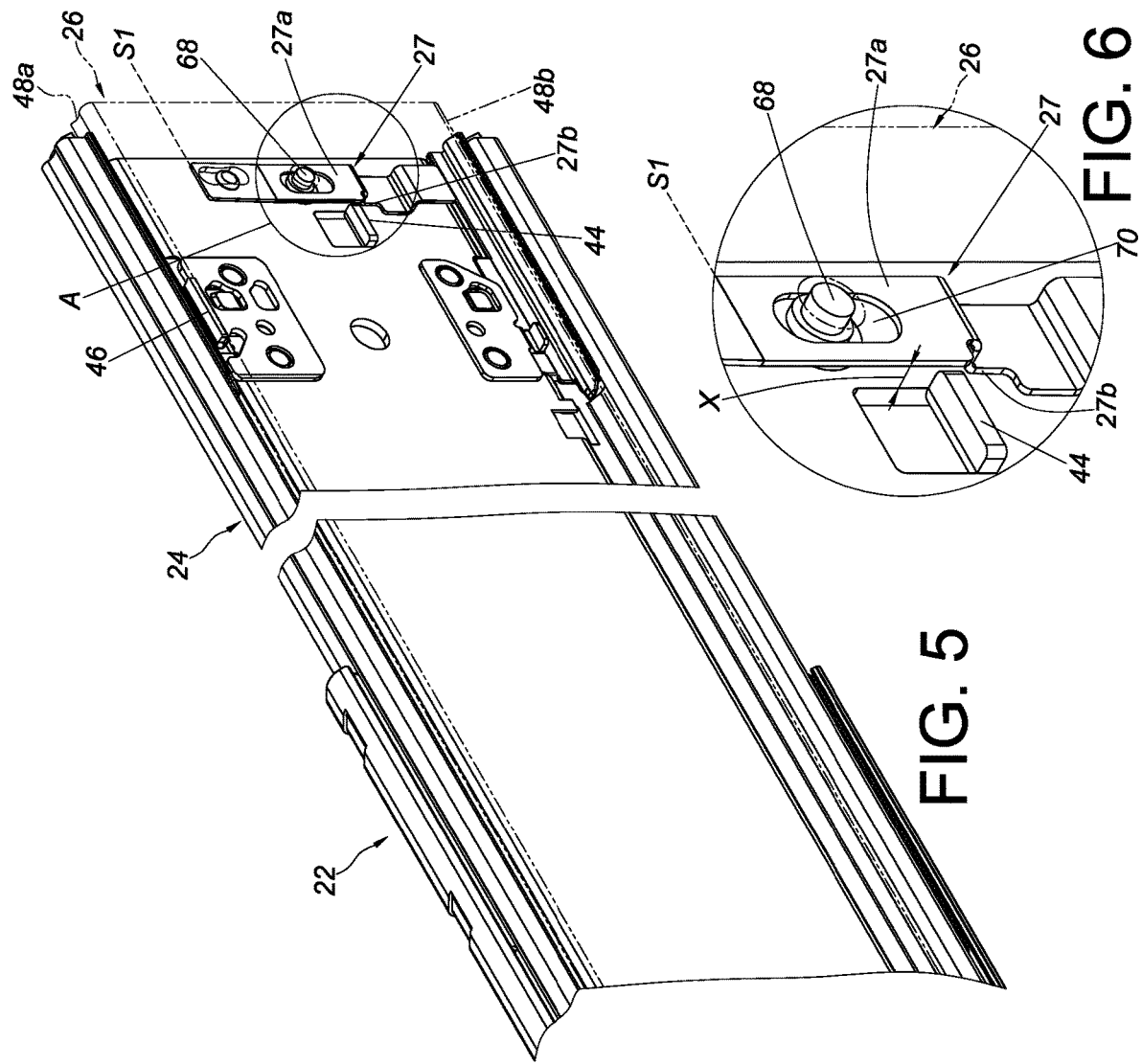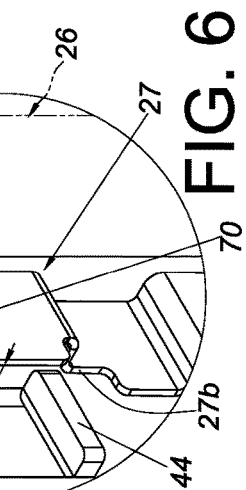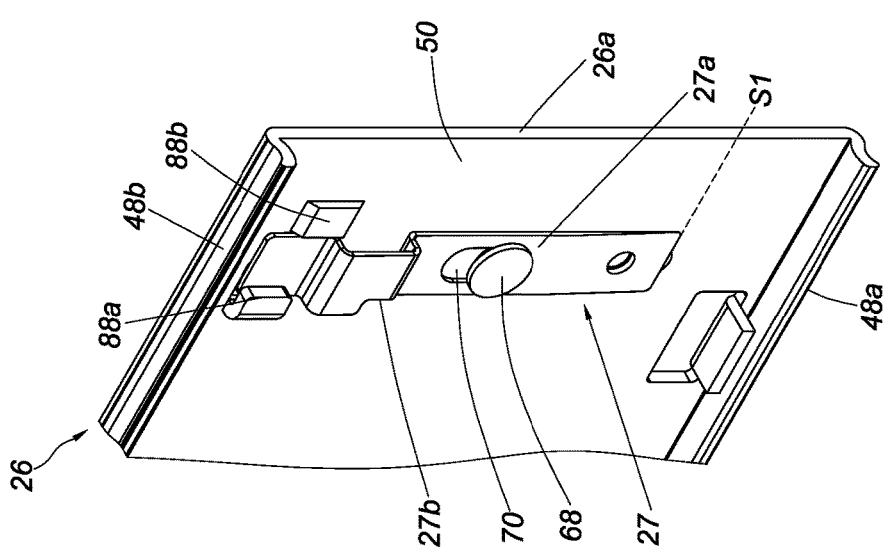

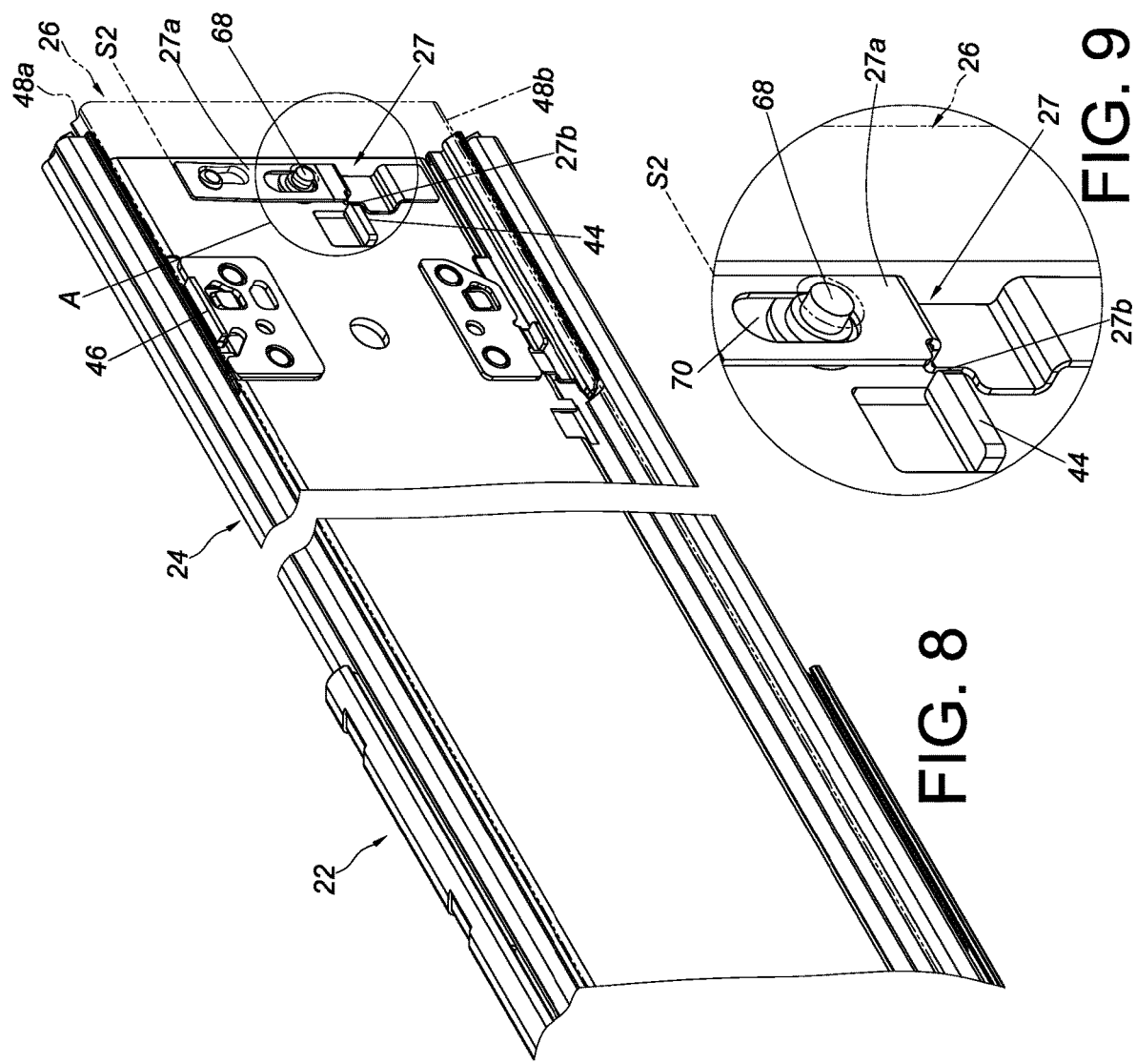
FIG. 8
FIG. 9
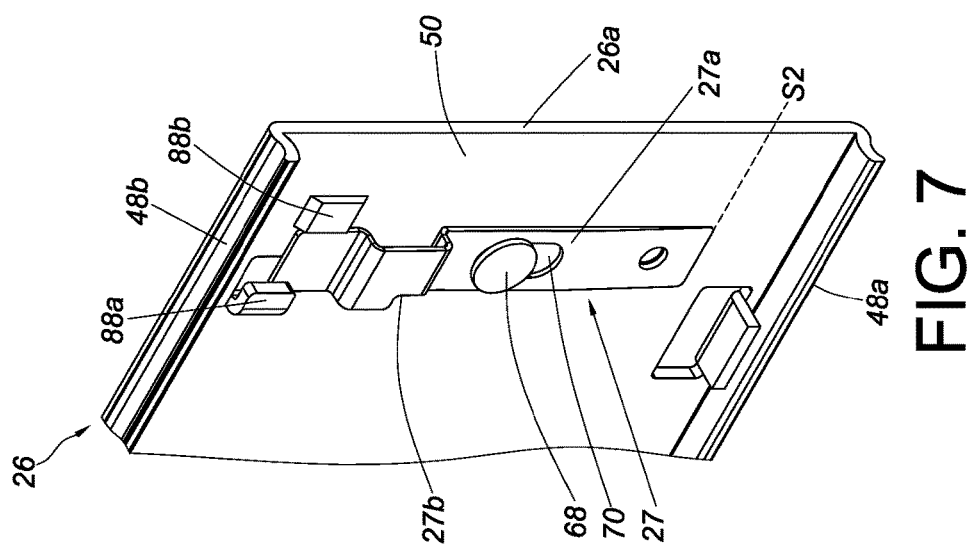
FIG. 7

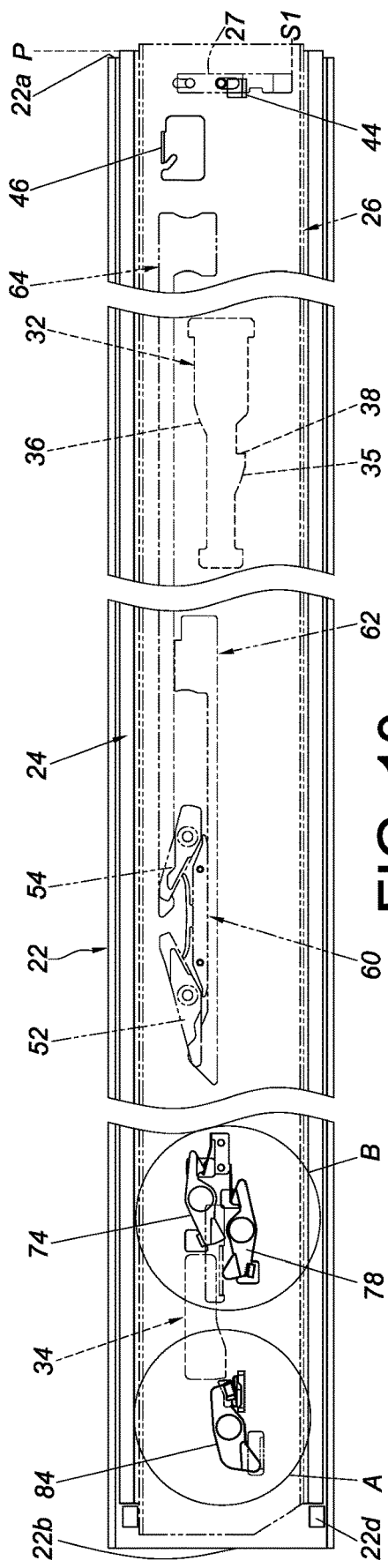

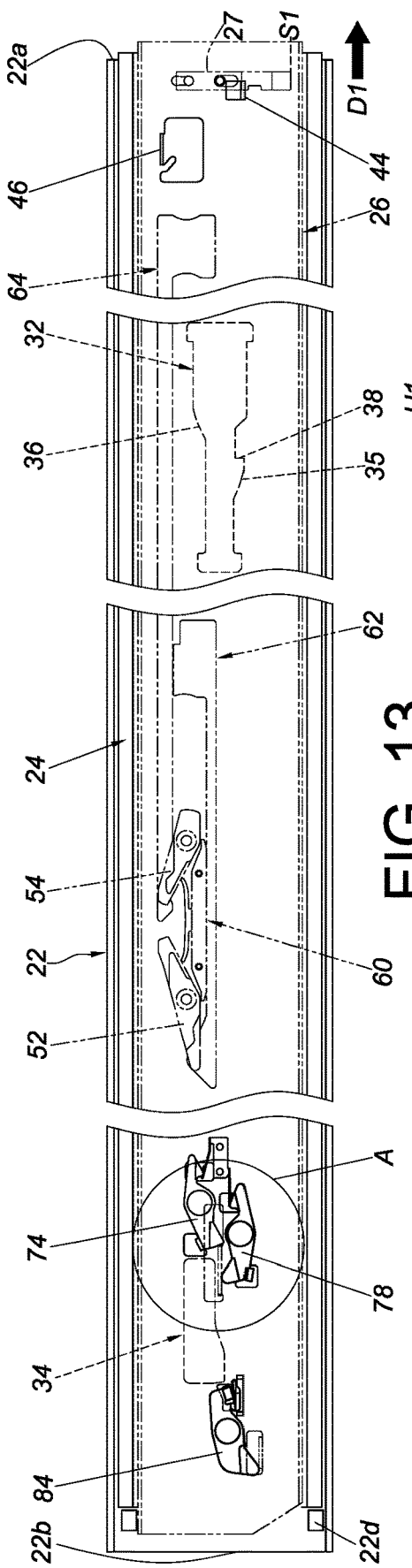
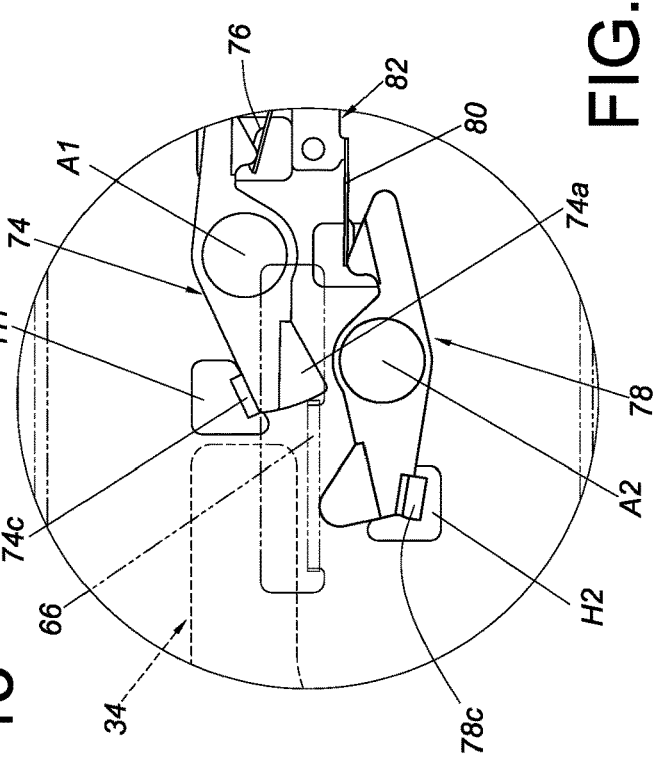
FIG. 13
FIG. 14

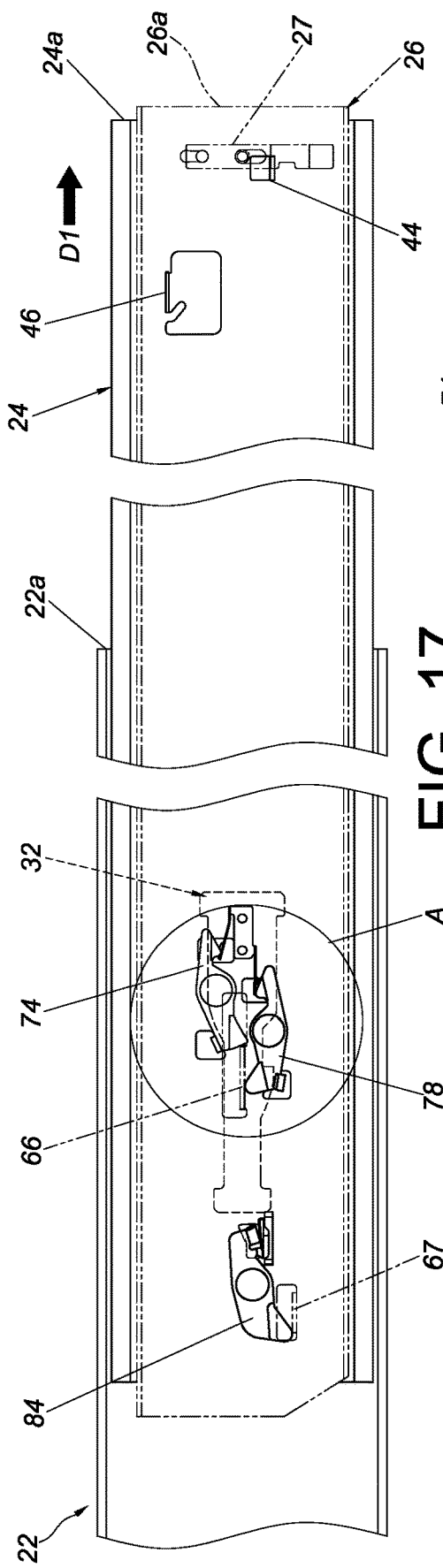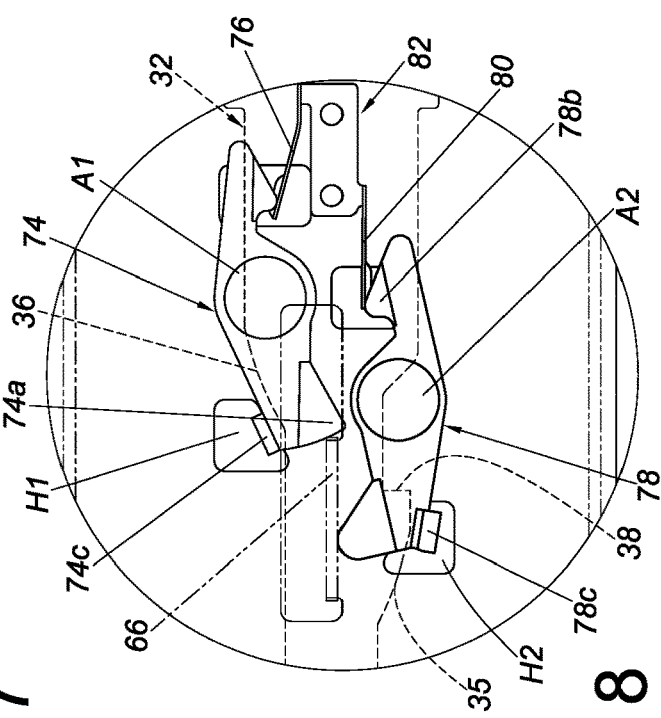
FIG. 17
FIG. 18

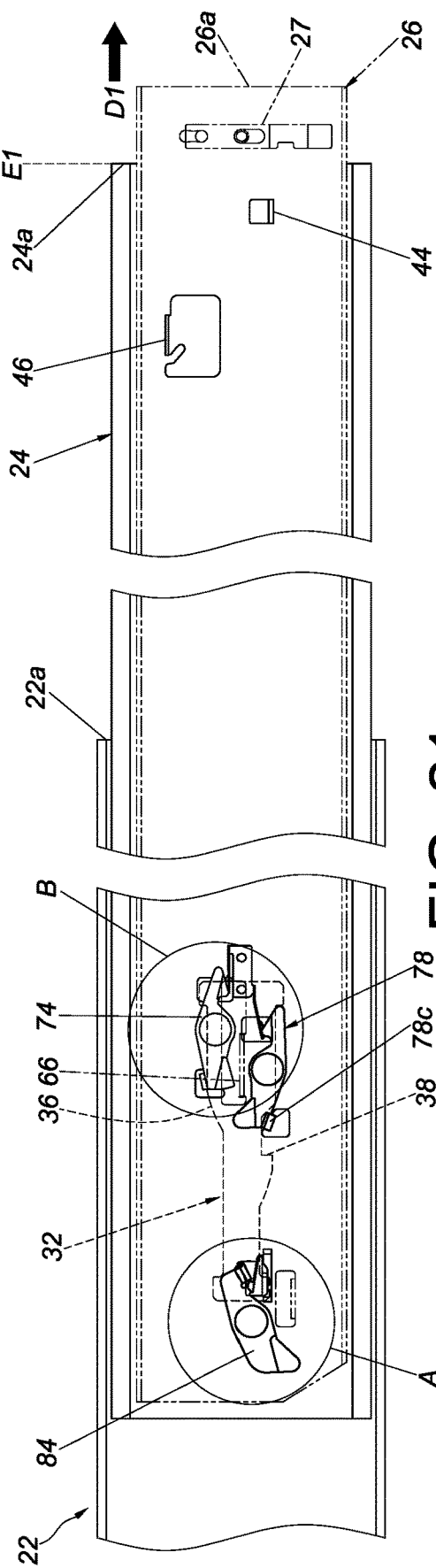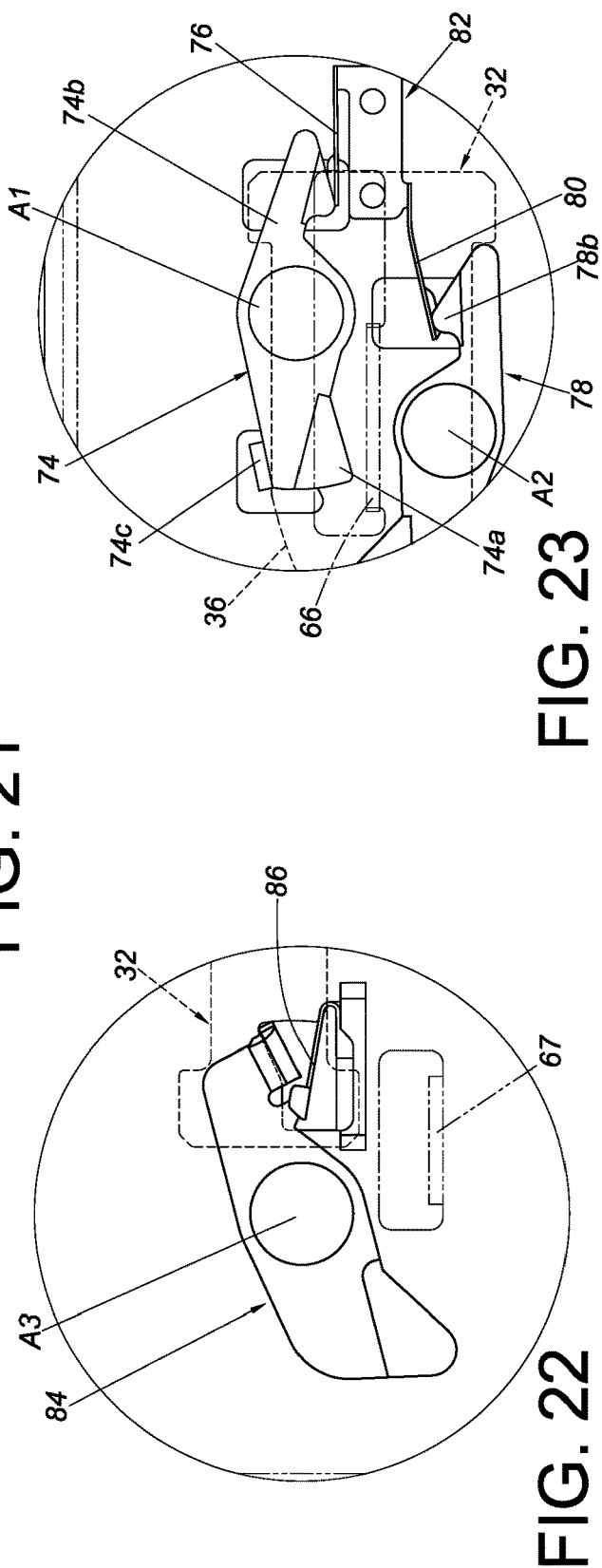

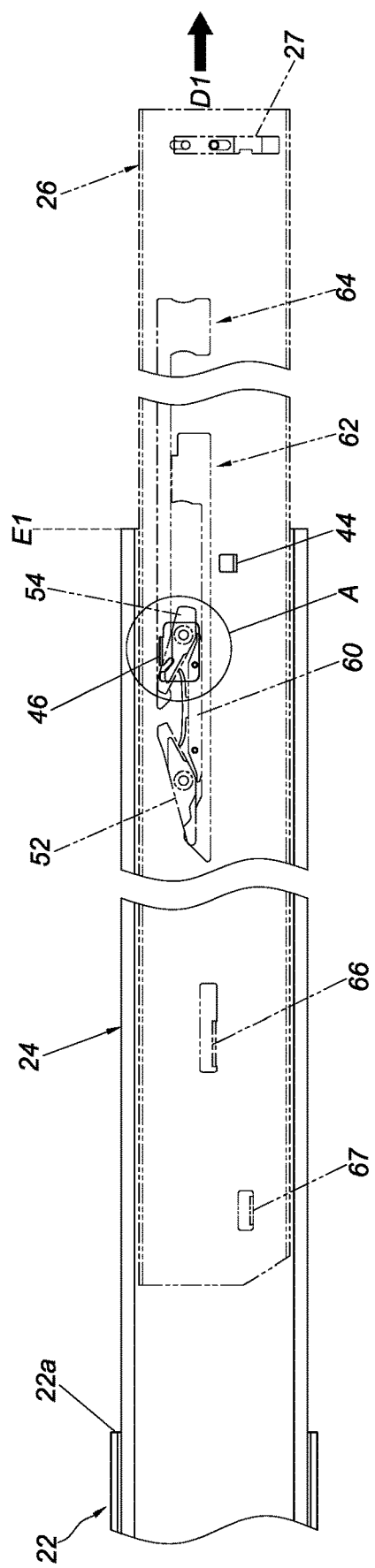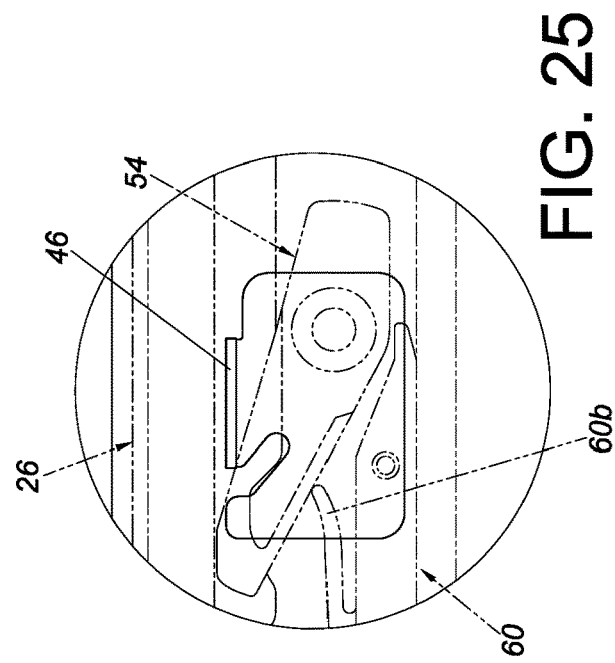
FIG. 24
FIG. 25

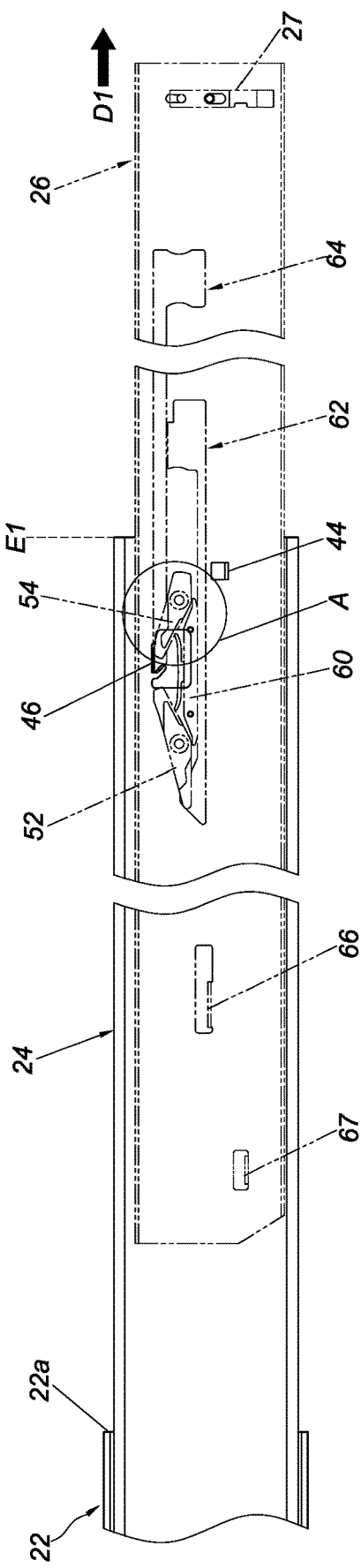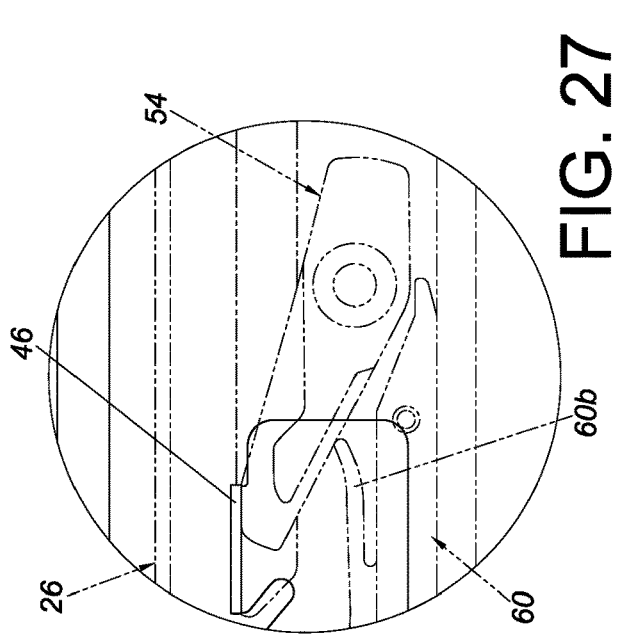

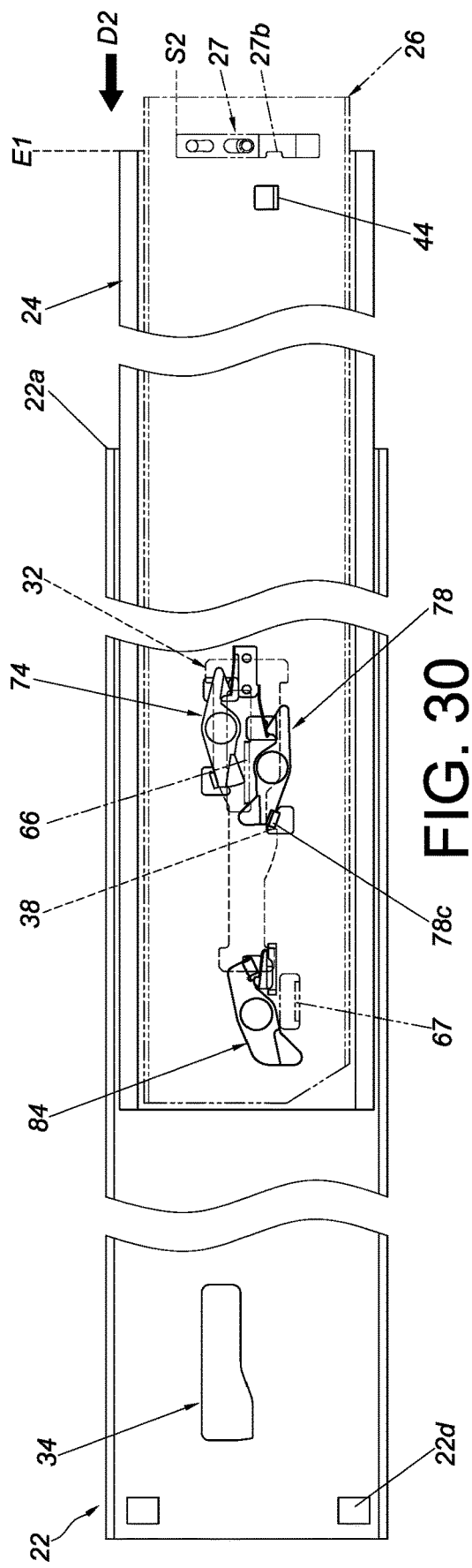
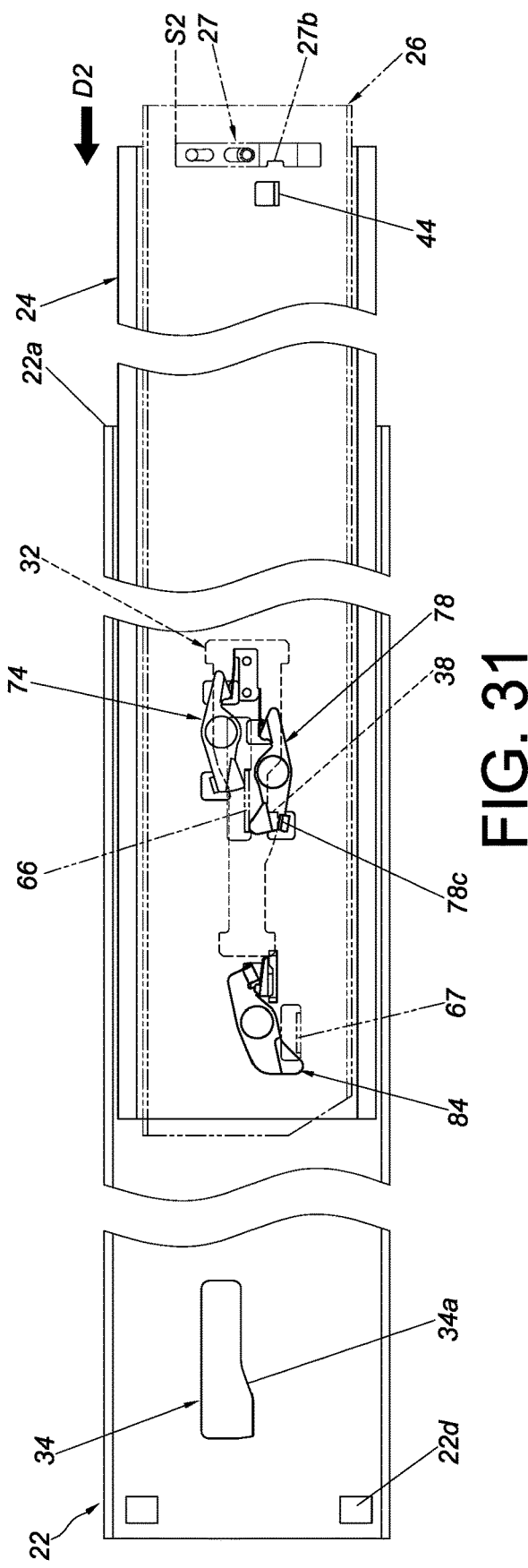

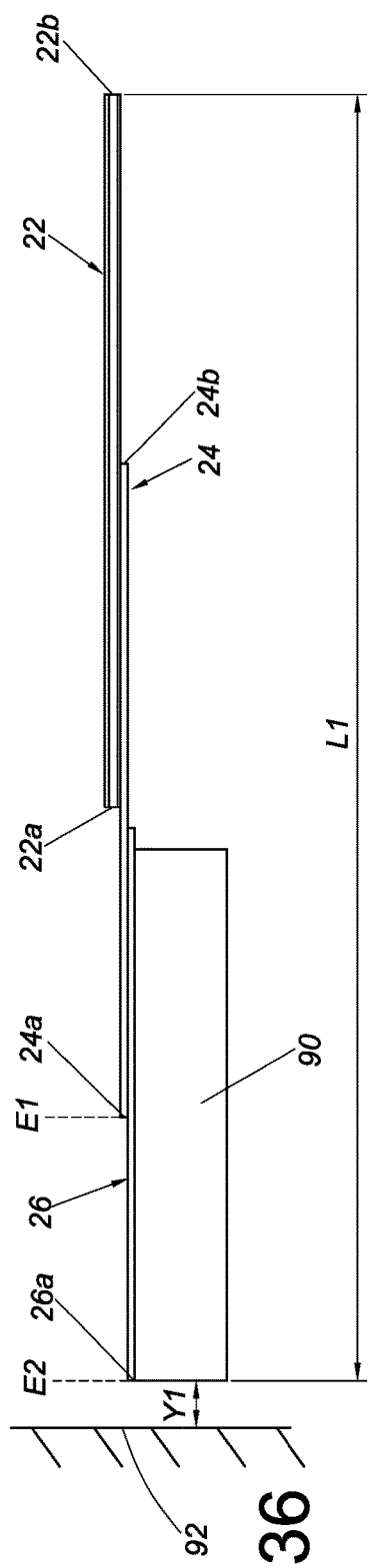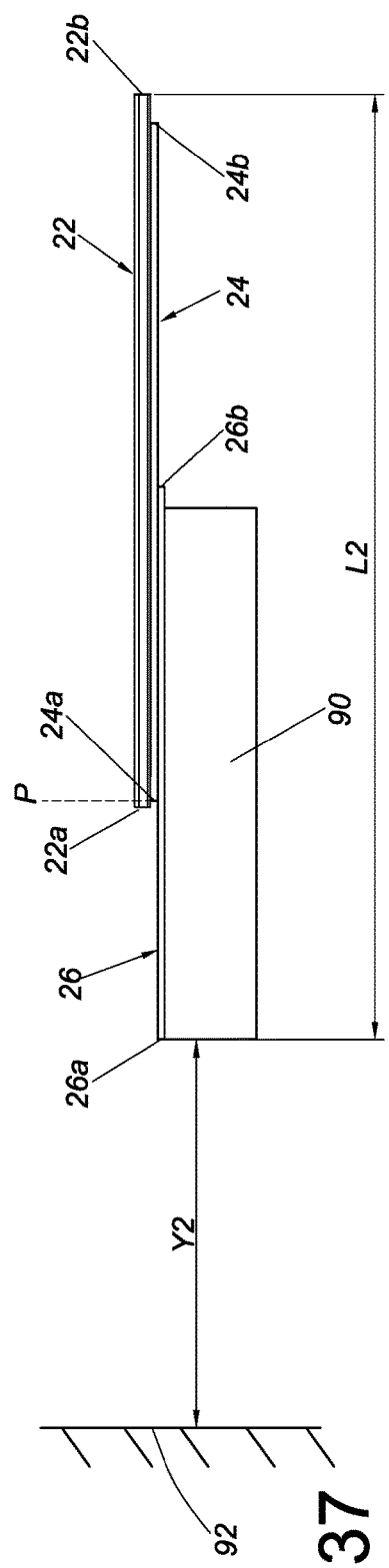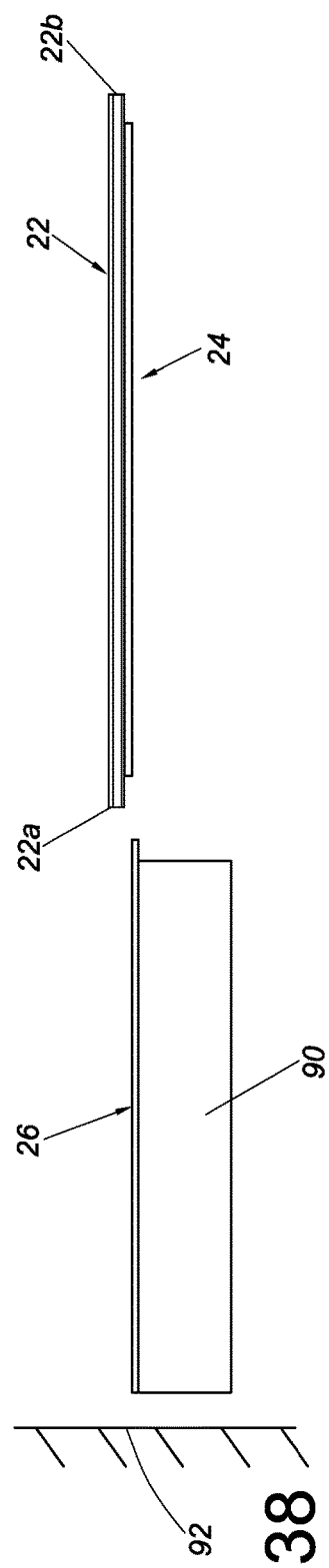

SLIDE RAIL ASSEMBLY AND OPERATION METHOD THEREOF

FIELD OF THE INVENTION

The present invention relates to a slide rail assembly and more particularly to a slide rail assembly whose extended length can be reduced so that even if the slide rail assembly is used in an environment with limited space, maintenance work on the slide rail assembly can still be performed with ease.

BACKGROUND OF THE INVENTION

Generally, a slide rail assembly includes at least two slide rails that can be displaced with respect to each other to bring the slide rail assembly into an extended or retracted state. Take for example a three-rail slide rail assembly that includes a first rail, a second rail, and a third rail. The slide rail assembly has an extended length when in an extended state achieved by displacing the second rail and the third rail with respect to the first rail in an opening direction. Sometimes, however, there may be spatial limitations (e.g., a limited space in which the slide rail assembly can be operated) that make it difficult to perform maintenance work on the assembly once the assembly reaches the extended length.

It is therefore important to develop a different slide rail product that can satisfy user needs despite the aforesaid spatial limitations.

SUMMARY OF THE INVENTION

The present invention provides a slide rail assembly whose innovative operation method allows the extended length of the slide rail assembly to be reduced.

According to one aspect of the present invention, a slide rail assembly includes a first rail, a second rail, a third rail, and a switching member. The second rail can be longitudinally displaced with respect to the first rail and is provided with a working feature. The third rail can be longitudinally displaced with respect to the second rail. The switching member can be operated and thereby switched between a first state and a second state. The second rail can be displaced with respect to the first rail to a first extended position in an opening direction, and the third rail can be displaced with respect to the first rail to a second extended position in the opening direction. By switching the switching member from the first state to the second state and displacing the third rail from the second extended position to a predetermined retracted position in a retracting direction, the switching member is brought into contact with the working feature of the second rail, thus allowing the third rail to displace the second rail to a predetermined position in the retracting direction, with the second rail displaced simultaneously with the third rail.

According to another aspect of the present invention, a slide rail assembly includes a first rail, a second rail, a third rail, and a switching member. The second rail can be displaced with respect to the first rail and is provided with a working feature. The third rail can be displaced with respect to the second rail. The switching member is disposed on the third rail and is configured to contact the working feature of the second rail when the third rail reaches a predetermined retracted position after being displaced from an extended position in a retracting direction, thereby allowing the third rail to displace the second rail to a predetermined position in the retracting direction, with the second rail displaced simultaneously with the third rail.

According to yet another aspect of the present invention, an operation method for changing the extended length of a slide rail assembly includes the steps of: providing the slide rail assembly, wherein the slide rail assembly includes a first rail, a second rail, and a third rail, the three rails can be displaced with respect to one another, and the second rail is provided with a working feature; providing a switching member disposed on the third rail, wherein the switching member can be operated and thereby switched between a first state and a second state; displacing the second rail and the third rail with respect to the first rail in an opening direction such that the slide rail assembly has a first extended length; switching the switching member from the first state to the second state; retracting the third rail from an extended position in a retracting direction such that the switching member in the second state contacts the working feature of the second rail, and then displacing the second rail to a predetermined position in the retracting direction by the third rail; and displacing the third rail in the opening direction with respect to the second rail at the predetermined position such that the slide rail assembly has a second extended length smaller than the first extended length.

BRIEF DESCRIPTION OF THE DRAWINGS

FIG. 4 is a partial perspective view of the third rail of the slide rail assembly according to the embodiment of the present invention, showing the switching member in a first state with respect to the third rail;

FIG. 5 is a partial see-through view of the slide rail assembly according to the embodiment of the present invention, showing the switching member in the first state, with the driving portion of the switching member offset from the working feature of the second rail;

FIG. 6 is an enlarged view of the circled area A in FIG. 5;

FIG. 7 is a partial perspective view of the third rail of the slide rail assembly according to the embodiment of the present invention, showing the switching member in a second state with respect to the third rail;

FIG. 8 is a partial see-through view of the slide rail assembly according to the embodiment of the present invention, showing that the switching member in the second state, with the driving portion of the switching member corresponding to (i.e., not offset from) the working feature of the second rail;

FIG. 9 is an enlarged view of the circled area A in FIG. 8;

FIG. 10 is a schematic view of the slide rail assembly according to the embodiment of the present invention, showing the slide rail assembly in the retracted state;

FIG. 11 is an enlarged view of the circled area A in FIG. 10;

FIG. 12 is an enlarged view of the circled area B in FIG. 10;

FIG. 13 is a schematic view of the slide rail assembly according to the embodiment of the present invention, showing that the third rail and the second rail of the slide rail assembly is displaced with respect to the first rail in an opening direction simultaneously;

FIG. 14 is an enlarged view of the circled area A in FIG. 13;

FIG. 17 is a schematic view of the slide rail assembly according to the embodiment of the present invention, showing that the third rail and the second rail of the slide rail assembly is further displaced with respect to the first rail in the opening direction simultaneously;

FIG. 18 is an enlarged view of the circled area A in FIG. 17;

FIG. 21 is a schematic view of the slide rail assembly according to the embodiment of the present invention, showing that the simultaneous displacement relationship between the second rail and the third rail of the slide rail assembly is terminated;

FIG. 22 is an enlarged view of the circled area A in FIG. 21;

FIG. 23 is an enlarged view of the circled area B in FIG. 21;

FIG. 24 is a schematic view of the slide rail assembly according to the embodiment of the present invention, showing that the third rail of the slide rail assembly is displaced in the opening direction with respect to the second rail at the first extended position;

FIG. 25 is an enlarged view of the circled area A in FIG. 24;

FIG. 26 is a schematic view of the slide rail assembly according to the embodiment of the present invention, showing that the third rail of the slide rail assembly is further displaced in the opening direction with respect to the second rail at the first extended position;

FIG. 27 is an enlarged view of the circled area A in FIG. 26;

FIG. 30 is a schematic view of the slide rail assembly according to the embodiment of the present invention, showing that the third rail of the slide rail assembly is further displaced in the retracting direction with respect to the second rail at the first extended position;

FIG. 31 is a schematic view of the slide rail assembly according to the embodiment of the present invention, showing that the third rail and the second rail of the slide rail assembly are displaced in the retracting direction;

FIG. 36 schematically shows that the slide rail assembly according to the embodiment of the present invention is used in a narrow space and is in a first extended state, in which the slide rail assembly has a first length;

FIG. 37 schematically shows that the slide rail assembly according to the embodiment of the present invention is in a second extended state, in which the slide rail assembly has a second length; and FIG. 38 is a schematic view of the slide rail assembly according to the embodiment of the present invention, showing that the third rail of the slide rail assembly is detached from the second rail, with the second rail retracted with respect to the first rail.

DETAILED DESCRIPTION OF THE INVENTION

Figure 1:
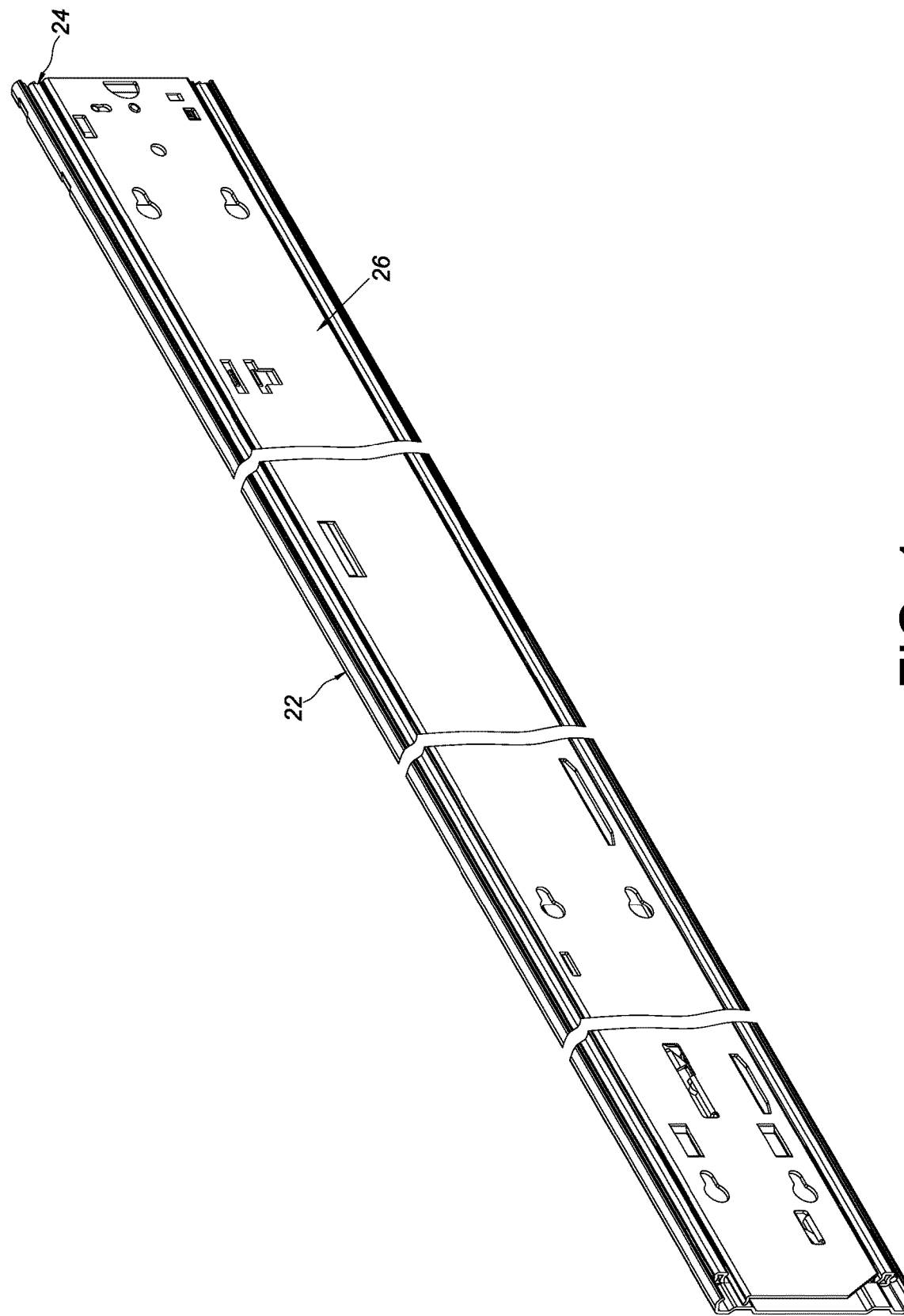
FIG. 1 is a perspective view of the slide rail assembly according to an embodiment of the present invention, showing the slide rail assembly in a retracted state.
Figure 2:
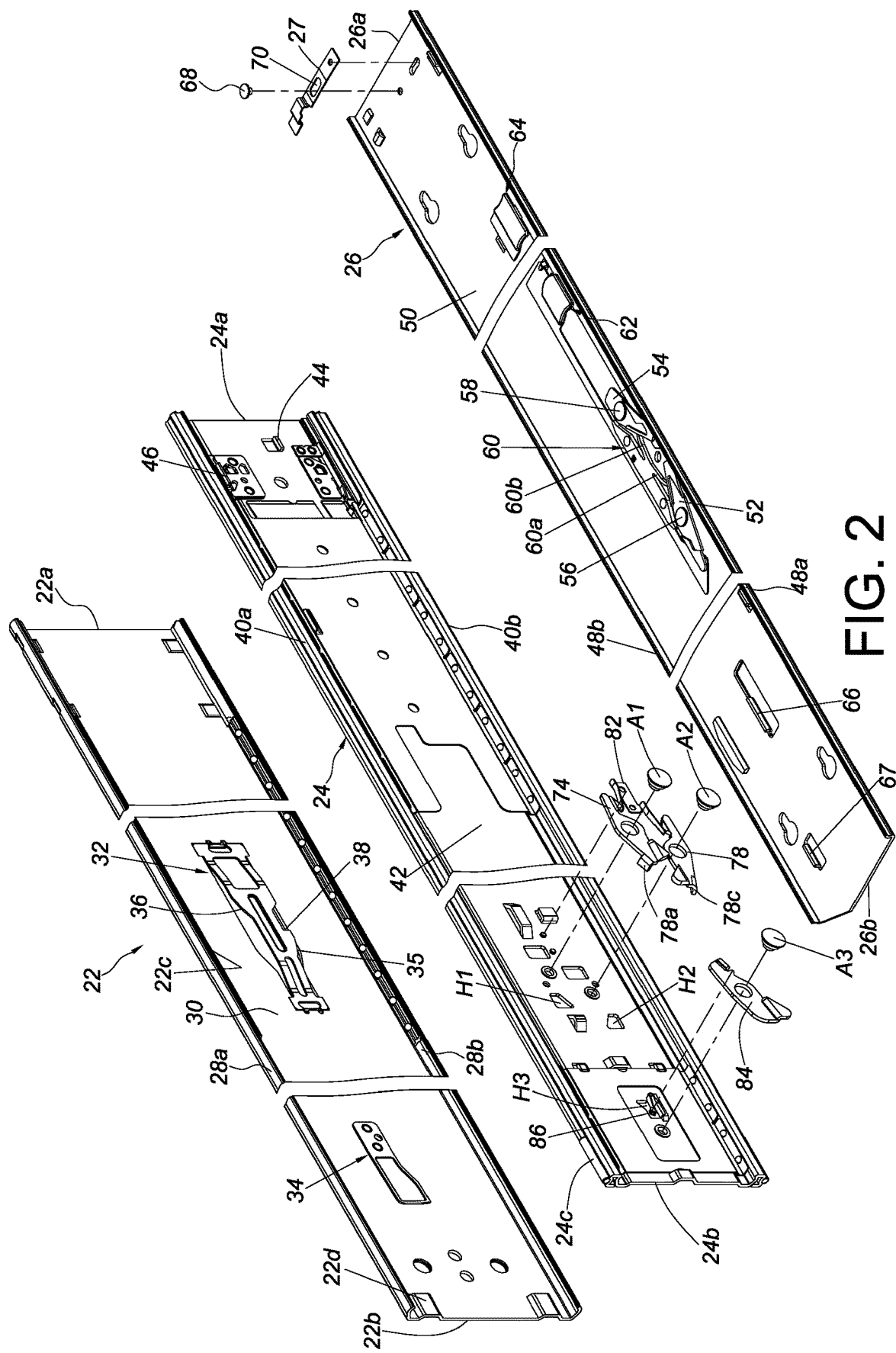
FIG. 2 is an exploded perspective view of the slide rail assembly according to the embodiment of the present invention, showing the first rail, the second rail, and the third rail separated from one another.

Referring to FIG. 1 and FIG. 2, the slide rail assembly according to an embodiment of the present invention includes a first rail 22, a second rail 24, a third rail 26, and a switching member 27. The slide rail assembly is shown in FIG. 1 in a retracted state.

The first rail 22 has a front end portion 22a and a rear end portion 22b. The first rail 22 includes a first wall 28a, a second wall 28b, and a longitudinal wall 30 connected between the first wall 28a and the second wall 28b of the first rail 22. The first wall 28a, the second wall 28b, and the longitudinal wall 30 of the first rail 22 jointly define a first channel Preferably, the first rail 22 is provided with a first auxiliary member 32 and a second auxiliary member 34. Here, the first auxiliary member 32 is an elastic plate disposed on the longitudinal wall 30 of the first rail 22 by way of example; implementation of the first auxiliary member 32, however, is not limited by the foregoing. Preferably, the first auxiliary member 32 includes a disengaging portion 36 and a position limiting portion 38. The second auxiliary member 34 is disposed on the longitudinal wall 30 of the first rail 22, and the second auxiliary member 34 is spaced apart from the first auxiliary member 32 by way of example. The first auxiliary member 32 is closer to the front end portion 22a of the first rail 22 than is the second auxiliary member 34, and the second auxiliary member 34 is closer to the rear end portion 22b of the first rail 22 than is the first auxiliary member 32.

The second rail 24 is movably mounted between the first rail 22 and the third rail 26. The second rail 24 can be longitudinally displaced with respect to the first rail 22. Here, the second rail 24 is mounted in the first channel of the first rail 22 by way of example. The second rail 24 has a front end portion 24a and a rear end portion 24b. The second rail 24 includes a first wall 40a, a second wall 40b, and a longitudinal wall 42 connected between the first wall 40a and the second wall 40b of the second rail 24. The first wall 40a, the second wall 40b, and the longitudinal wall 42 of the second rail 24 jointly define a second channel. The second rail 24 is provided with a working feature 44. For example, the working feature 44 is a projection, or a wall surface of a specific structure, disposed on the longitudinal wall 42 of the second rail 24; implementation of the working feature 44, however, is not limited by the foregoing. Preferably, the second rail 24 is further provided with a blocking portion 46, and the blocking portion 46 is, for example, a projection disposed on the longitudinal wall 42 of the second rail 24. Preferably, the working feature 44 and the blocking portion 46 are adjacent to the front end portion 24a of the second rail 24.

The third rail 26 can be longitudinally displaced with respect to the second rail 24. Here, the third rail 26 is mounted in the second channel of the second rail 24 by way of example. The third rail 26 has a front end portion 26a and a rear end portion 26b. The third rail 26 includes a first wall 48a, a second wall 48b, and a longitudinal wall 50 connected between the first wall 48a and the second wall 48b of the third rail 26. Preferably, the slide rail assembly further includes a first working member 52 and a second working member 54 mounted respectively at two positions of the longitudinal wall 50 of the third rail 26. Preferably, the first working member 52 and the second working member 54 are pivotally connected to the longitudinal wall 50 of the third rail 26 through a first pivotally connecting element 56 and a second pivotally connecting element 58 respectively. Preferably, the slide rail assembly further includes a base 60 with a first elastic portion 60a and a second elastic portion 60b for applying elastic forces to the first working member 52 and the second working member 54 respectively, thereby keeping each of the first working member 52 and the second working member 54 in a first working state with respect to the third rail 26. Preferably, the slide rail assembly further includes a first operating member 62 and a second operating member 64, through each of which a user can operate the corresponding first working member 52 or second working member 54 and thereby bring the corresponding first working member 52 or second working member 54 out of the first working state. Preferably, the third rail 26 has a contact feature 66 and a supporting feature 67 disposed, for example, at two positions of the longitudinal wall 50 of the third rail 26 respectively.

The switching member 27 is movably disposed on the third rail 26. Here, the switching member 27 is vertically movably connected to the longitudinal wall 50 of the third rail 26 through, for example, at least one connecting element 68 and a slot 70 that are configured to work with each other. More specifically, one of the switching member 27 and the third rail 26 has the slot 70, and the other of the switching member 27 and the third rail 26 has the at least one connecting element 68, wherein the at least one connecting element 68 extends through a portion of the slot 70 and mounts the switching member 27 to the third rail 26. The switching member 27 is preferably adjacent to the front end portion 26a of the third rail 26 to save space.

Figure 3:
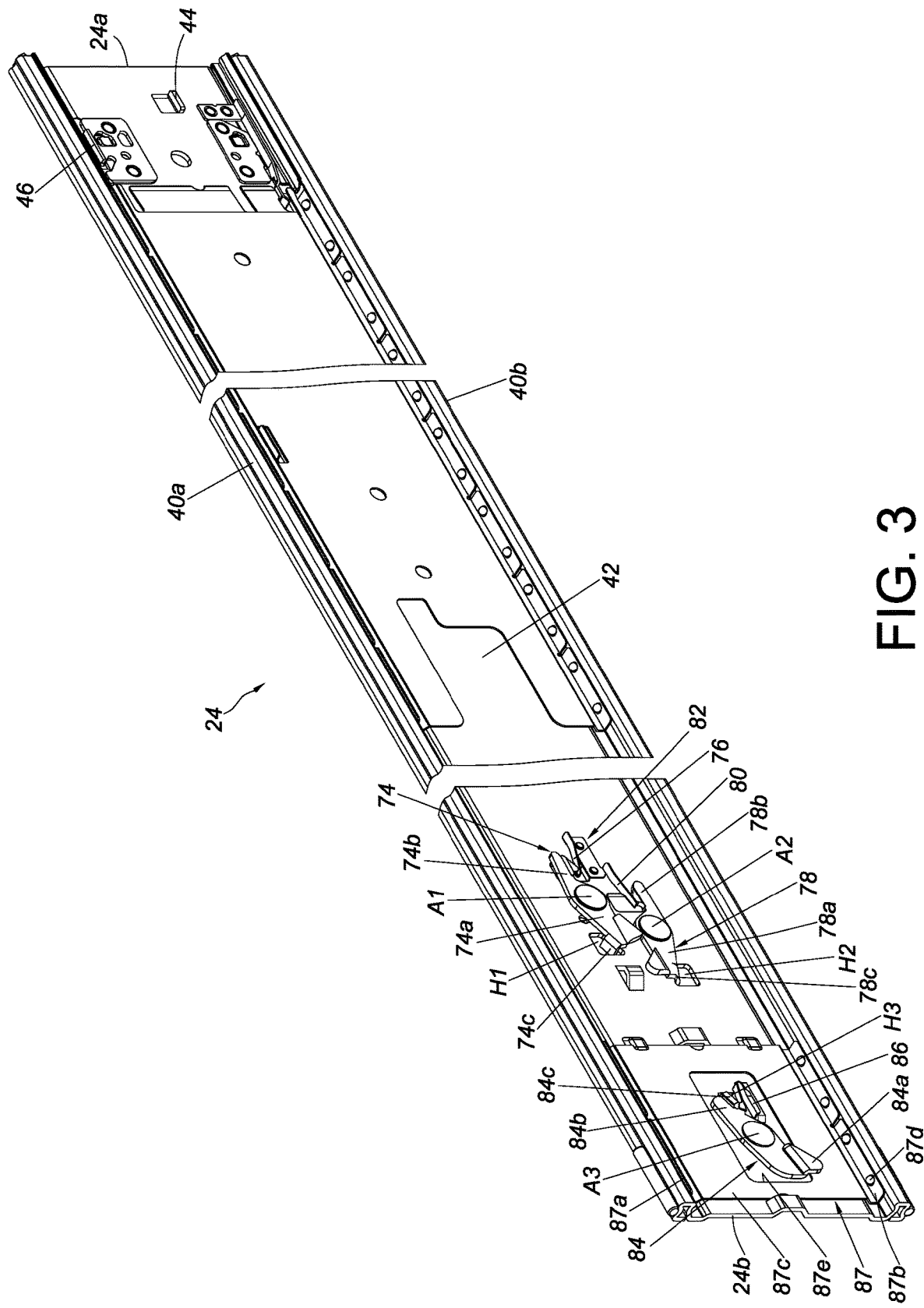
FIG. 3 is a perspective view of the second rail of the slide rail assembly according to the embodiment of the present invention.

As shown in FIG. 2 and FIG. 3, the slide rail assembly further includes a synchronizing mechanism, a first engaging mechanism, and a second engaging mechanism, all of which are movably mounted on the second rail 24.

The synchronizing mechanism is configured to work in conjunction with the contact feature 66 of the third rail 26. Preferably, the synchronizing mechanism includes a synchronizing member 74 and a first elastic member 76 for applying an elastic force to the synchronizing member 74. The synchronizing member 74 includes a first portion 74a and a second portion 74b. A first shaft A1 is located between the first portion 74a and the second portion 74b of the synchronizing member 74 and pivotally connects the synchronizing member 74 to the longitudinal wall 42 of the second rail 24. Preferably, the synchronizing member 74 further includes an extension leg 74c adjacent to the first portion 74a of the synchronizing member 74. The extension leg 74c extends through a first hole H1 in the longitudinal wall 42 of the second rail 24 and faces the longitudinal wall 30 of the first rail 22. As the extension leg 74c is limited in position between two opposite hole walls of the first hole H1, the synchronizing member 74 can be pivoted only within a limited range. The first elastic member 76 applies an elastic force to the second portion 74b of the synchronizing member 74 to keep the synchronizing member 74 in a first predetermined state.

The first engaging mechanism includes a first engaging member 78 and a second elastic member 80 for applying an elastic force to the first engaging member 78. The first engaging member 78 includes a first portion 78a and a second portion 78b. A second shaft A2 is located between the first portion 78a and the second portion 78b of the first engaging member 78 and pivotally connects the first engaging member 78 to the longitudinal wall 42 of the second rail 24. Preferably, the first engaging member 78 further includes an extension leg 78c adjacent to the first portion 78a of the first engaging member 78. The extension leg 78c extends through a second hole H2 in the longitudinal wall 42 of the second rail 24 and faces the longitudinal wall 30 of the first rail 22. As the extension leg 78c is limited in position between two opposite hole walls of the second hole H2, the first engaging member 78 can be pivoted only within a limited range. The second elastic member 80 applies an elastic force to the second portion 78b of the first engaging member 78 to keep the first engaging member 78 in a first predetermined state. Preferably, the second elastic member 80 and the first elastic member 76 are two elastic arms extending from a stationary member 82, and the stationary member 82 is fixedly connected to the longitudinal wall 42 of the second rail 24.

The second engaging mechanism includes a second engaging member 84 and a third elastic member 86 for applying an elastic force to the second engaging member 84. The second engaging member 84 includes a first portion 84a and a second portion 84b. A third shaft A3 is located between the first portion 84a and the second portion 84b of the second engaging member 84 and pivotally connects the second engaging member 84 to the longitudinal wall 42 of the second rail 24. Preferably, the second engaging member 84 further includes an extension leg 84c adjacent to the second portion 84b of the second engaging member 84. The extension leg 84c extends through a third hole H3 in the longitudinal wall 42 of the second rail 24 and faces the longitudinal wall 30 of the first rail 22. As the extension leg 84c is limited in position between two opposite hole walls of the third hole H3, the second engaging member 84 can be pivoted only within a limited range. The third elastic member 86 applies an elastic force to the second portion 84b of the second engaging member 84. In this embodiment, the slide rail assembly further includes a supporting frame 87 mounted adjacent to the rear end portion 24b of the second rail 24. More specifically, the supporting frame 87 includes an upper support section 87a, a lower support section 87b, and a middle section 87c connected between the upper support section 87a and the lower support section 87b.

The supporting frame 87 further includes a plurality of balls 87d mounted in the upper support section 87a and the lower support section 87b in order to support the third rail 26 while the third rail 26 is in the last stage of retraction with respect to the second rail 24. The middle section 87c is provided with an aperture 87e. The aperture 87e is so located that the second engaging mechanism is provided on the second rail 24 without being obstructed by the middle section 87c.

FIG. 4 shows the switching member 27 in a first state S1 (e.g., at a first position), waiting to be operated. Preferably, the switching member 27 includes a main body portion 27a and a driving portion 27b. The main body portion 27a and the driving portion 27b are staggered and therefore have a positional difference X therebetween (e.g., a difference in height as shown more clearly in FIG. 6). Preferably, the longitudinal wall 50 of the third rail 26 includes at least one supporting structure, such as a first supporting structure 88a and a second supporting structure 88b for supporting the switching member 27 from two opposite sides respectively.

When the switching member 27 is in the first state S1, referring to FIG. 5 and FIG. 6, the driving portion 27b of the switching member 27 is offset in position from the working feature 44 of the second rail 24, and the existence of the positional difference X allows the main body portion 27a of the switching member 27 to avoid contact with the working feature 44 of the second rail 24 (see FIG. 6), e.g., with the main body portion 27a of the switching member 27 being higher than the working feature 44 of the second rail 24 in the transverse direction by the positional difference X.

Referring to FIG. 7, the switching member 27 can be switched from the first state S1 to a second state S2 (e.g., to a second position).

When the switching member 27 is in the second state S2, referring to FIG. 8 and FIG. 9, the driving portion 27b of the switching member 27 is no longer offset in position from the working feature 44 of the second rail 24; in other words, the driving portion 27b of the switching member 27 in this state corresponds in position to the working feature 44 of the second rail 24.

FIG. 10, FIG. 11, and FIG. 12 show the slide rail assembly in the retracted state. The second rail 24 is at a predetermined position P (such as but not limited to a retracted position) with respect to the first rail 22, and the third rail 26 is retracted with respect to the second rail 24. Moreover, the second engaging member 84 is in a first predetermined state, with the first portion 84a of the second engaging member 84 abutting against the supporting feature 67 of the third rail 26, and with the second portion 84b of the second engaging member 84 holding down the third elastic member 86 such that the third elastic member 86 stores an elastic force. While the second engaging member 84 is in the first predetermined state, the extension leg 84c of the second engaging member 84 is offset in position from the second auxiliary member 34 of the first rail 22 (see FIG. 11). In the meantime, the synchronizing member 74 and the first engaging member 78 are kept in their respective first predetermined states by the elastic force of the first elastic member 76 and the elastic force of the second elastic member 80 respectively (see FIG. 12). In addition, the contact feature 66 of the third rail 26 is spaced apart from the synchronizing member 74, and the first engaging member 78 is spaced apart from the first auxiliary member 32 of the first rail 22. Preferably, the first auxiliary member 32 further includes a guiding portion 35 adjacent to the position limiting portion 38, wherein the guiding portion 35 is, for example but not limited to, an inclined surface or a curved surface. Furthermore, the first working member 52 and the second working member 54 are spaced apart from the blocking portion 46 of the second rail 24. It is worth mentioning that the switching member 27 in this embodiment is preset in the first state S1; in other embodiments, however, the switching member 27 need not be so preset.

Once the third rail 26 is displaced a certain distance in an opening direction D1, referring to FIG. 13 and FIG. 14, the contact feature 66 of the third rail 26 is in contact with the first portion 74a of the synchronizing member 74 of the synchronizing mechanism. The third rail 26, therefore, can displace the second rail 24 from the predetermined position P in the opening direction D1, with the contact feature 66 pushing the first portion 74a of the synchronizing member 74, and with the second rail 24 displaced simultaneously with the third rail 26 as a result.

Figure 15:
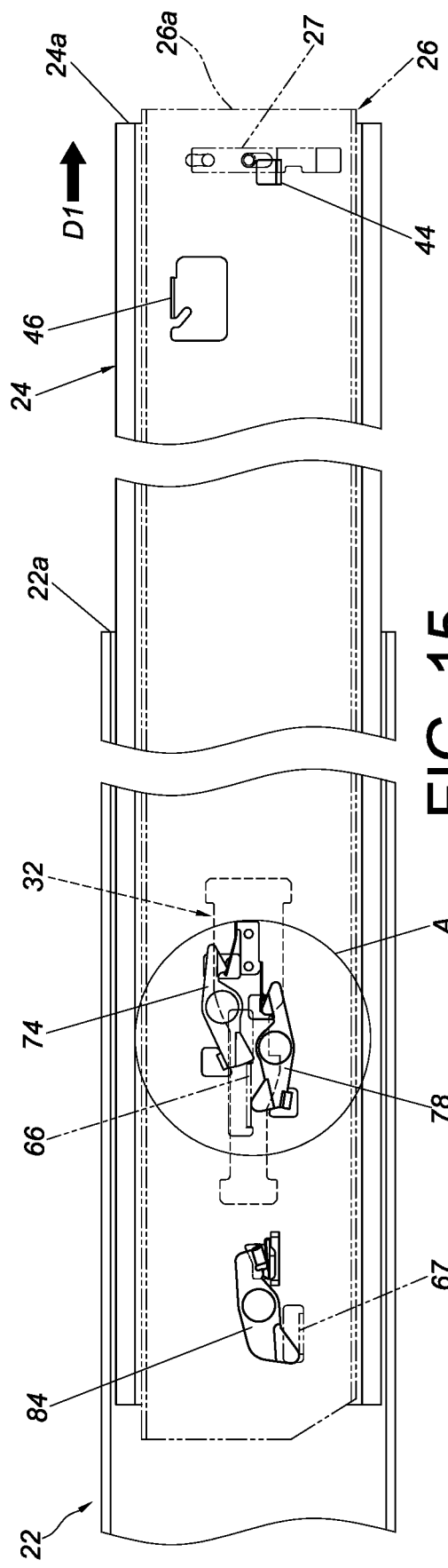
FIG. 15 is a schematic view of the slide rail assembly according to the embodiment of the present invention, showing that the third rail and the second rail of the slide rail assembly is further displaced with respect to the first rail in the opening direction simultaneously.
Figure 16:
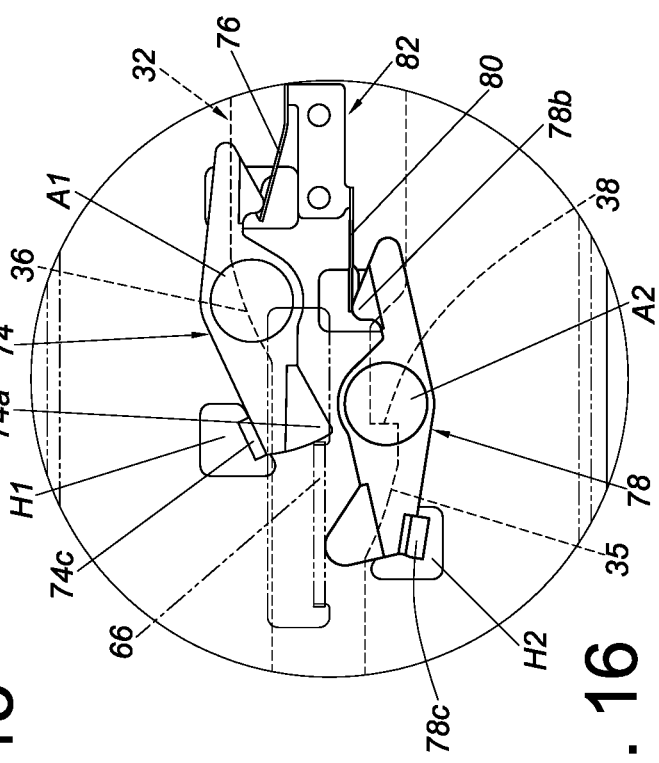
FIG. 16 is an enlarged view of the circled area A in FIG. 15.

Referring to FIG. 15 and FIG. 16, when the second rail 24 reaches a predetermined location after being displaced by, and simultaneously with, the third rail 26 in the opening direction D1 with respect to the first rail 24 thanks to the contact feature 66 pushing the first portion 74a of the synchronizing member 74, the extension leg 78c of the first engaging member 78 comes into contact with the guiding portion 35 of the first auxiliary member 32 of the first rail 22.

When the third rail 26 and the second rail 24 are further displaced in the opening direction D1 simultaneously, referring to FIG. 17 and FIG. 18, the extension leg 78c of the first engaging member 78 is guided by the guiding portion 35 of the first auxiliary member 32 of the first rail 22 such that the first engaging member 78 is pivoted through an angle and thus brought out of the first predetermined state (e.g., into a second predetermined state), with the second elastic member 80 temporarily pressed by the second portion 78b of the first engaging member 78 and hence storing an elastic force.

Figure 19:
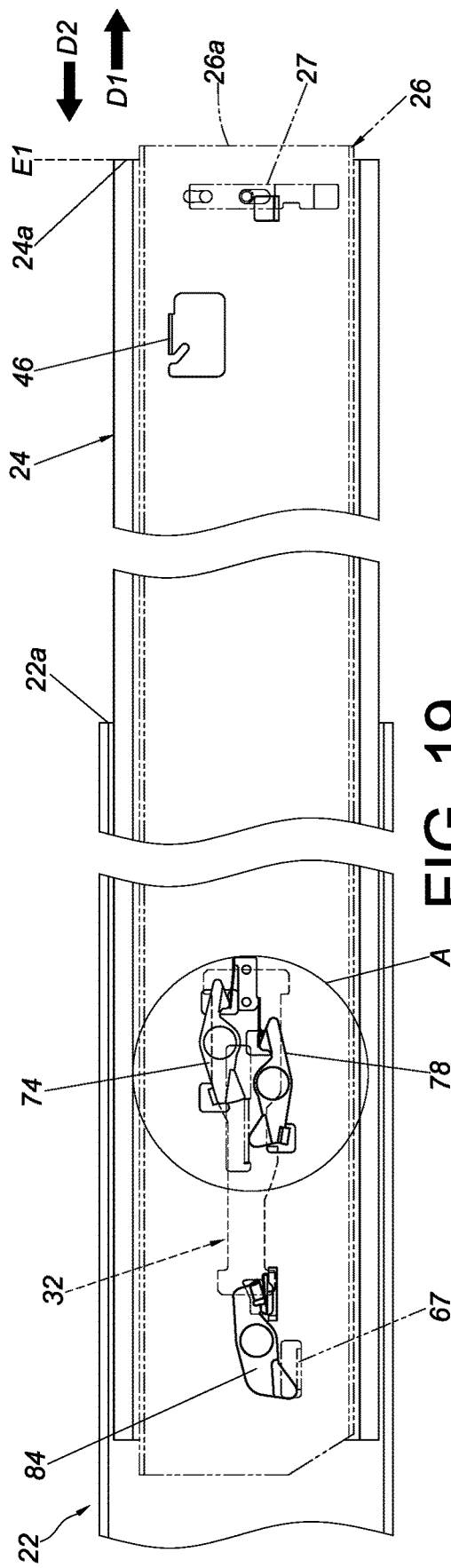
FIG. 19 is a schematic view of the slide rail assembly according to the embodiment of the present invention, showing the second rail of the slide rail assembly at a first extended position with respect to the first rail.
Figure 20:
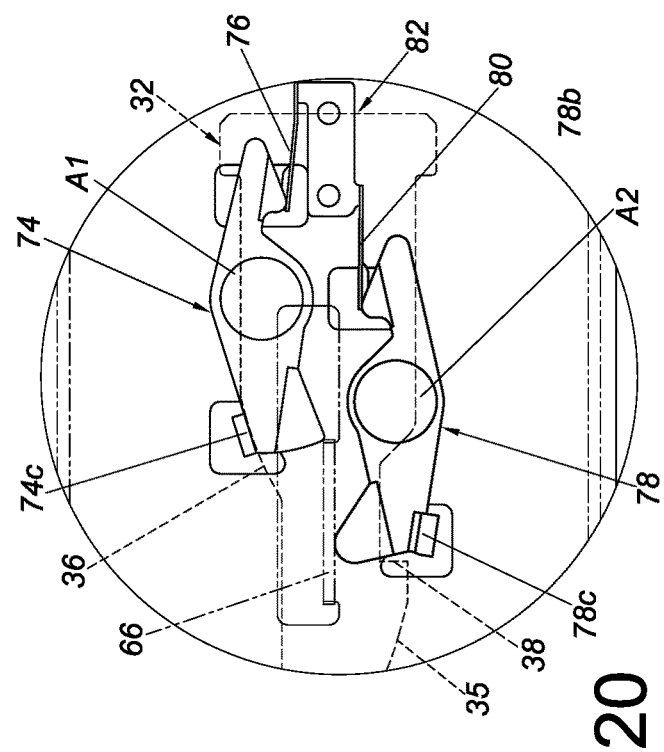
FIG. 20 is an enlarged view of the circled area A in FIG. 19.

When the second rail 24 reaches a first extended position E1 with respect to the first rail 22 after being further displaced in the opening direction D1 simultaneously with the third rail 26, referring to FIG. 19 and FIG. 20, the first engaging member 78 of the first engaging mechanism is adjacent to the position limiting portion 38 of the first auxiliary member 32 to prevent the second rail 24 from being displaced with respect to the first rail 22 from the first extended position E1 in a retracting direction D2. More specifically, when the second rail 24 is at the first extended position E1 with respect to the first rail 22, the extension leg 78c of the first engaging member 78 is guided to the position limiting portion 38 by the guiding portion 35 of the first auxiliary member 32 of the first rail 22, and the second elastic member 80 releases the elastic force stored therein such that the extension leg 78c of the first engaging member 78 is kept adjacent to and blocked by the position limiting portion 38 of the first auxiliary member 32, preventing the second rail 24 from being displaced with respect to the first rail 22 from the first extended position E1 in the retracting direction D2. Meanwhile, the extension leg 74c of the synchronizing member 74 is in contact with the disengaging portion 36 of the first auxiliary member 32, wherein the disengaging portion 36 is, for example, an inclined surface or a curved surface.

Referring to FIG. 21, FIG. 22, and FIG. 23, the third rail 26 can be displaced in the opening direction D1 with respect to the second rail 24 at the first extended position E1 so that the first portion 84a of the second engaging member 84 is no longer abuts against the supporting feature 67 of the third rail 26, and once the third rail 26 is so displaced, the third elastic member 86 will release the elastic force stored therein and thereby pivot the second engaging member 84 through an angle, bringing the second engaging member 84 out of the first predetermined state (e.g., into a second predetermined state as shown in FIG. 22). More specifically, when the third rail 26 and the second rail 24 reach a predetermined location after being displaced in the opening direction D1, the synchronizing member 74 of the synchronizing mechanism is separated from the contact feature 66 of the third rail 26 by the disengaging portion 36 of the first auxiliary member 32; as a result, the simultaneous displacement relationship between the third rail 26 and the second rail 24 is terminated (see FIG. 23). Even more specifically, when the third rail 26 and the second rail 24 reach the predetermined location, the extension leg 74c of the synchronizing member 74 arrives at a position (e.g., the highest position) of the disengaging portion 36 of the first auxiliary member 32 that causes the synchronizing member 74 to pivot through an angle and thus leave the first predetermined state (e.g., enter a second predetermined state). Consequently, the contact feature 66 of the third rail 26 is offset in position from the first portion 74a of the synchronizing member 74, making it impossible for the second rail 24 to be displaced by, and simultaneously with, the third rail 26. The first elastic member 76 in this state is held down by the second portion 74b of the synchronizing member 74 and stores an elastic force. It is worth mentioning that the second rail 24 may have a structural feature (e.g., an abutting member 24c adjacent to the rear end portion 24b of the second rail 24 as shown in FIG. 2) configured to abut against, either directly or indirectly, at least one corresponding feature of the first rail 22 (e.g., a strip of balls 22c provided on the first rail 22) and thereby prevent the second rail 24 from being displaced with respect to the first rail 22 from the first extended position E1 in the opening direction D1.

When the third rail 26 reaches another location after being displaced in the opening direction D1 with respect to the second rail 24 at the first extended position E1, referring to FIG. 24 and FIG. 25, the second working member 54 comes into contact with a first side of the blocking portion 46 of the second rail 24.

When the third rail 26 is further displaced in the opening direction D1 with respect to the second rail 24 at the first extended position E1, referring to FIG. 26 and FIG. 27, the contact between the second working member 54 and the blocking portion 46 of the second rail 24 results in a force that pivots the second working member 54 through an angle such that the second working member 54 is no longer in the first working state (e.g., enters a second working state) and can therefore be moved past the first side of the blocking portion 46 of the second rail 24. The second elastic portion 60b of the base 60 stores an elastic force responsive to the second working member 54 being pivoted through the aforesaid angle.

Figure 28:
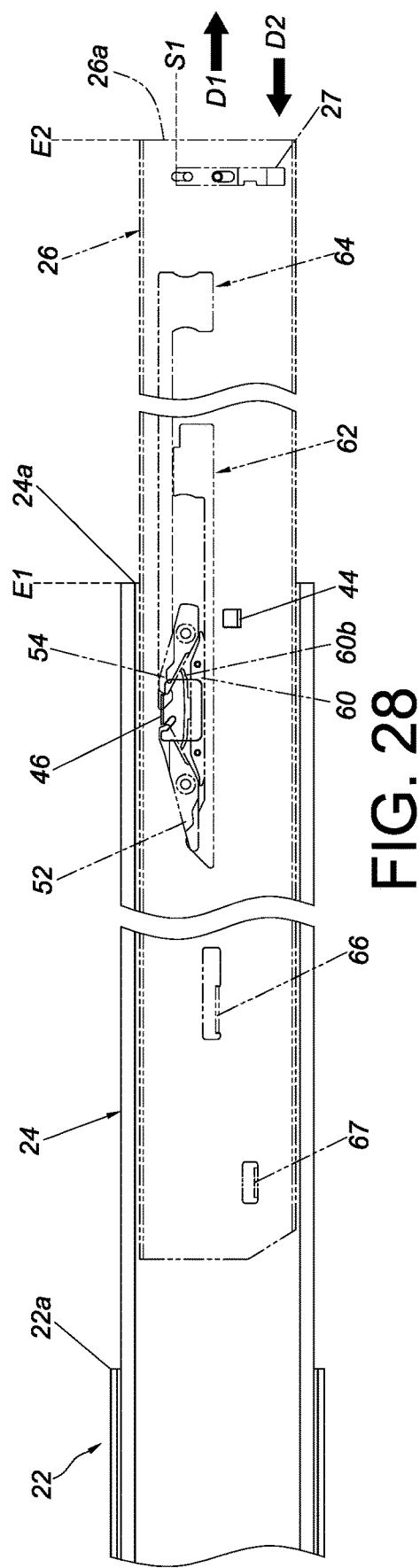
FIG. 28 is a schematic view of the slide rail assembly according to the embodiment of the present invention, showing that the third rail of the slide rail assembly is at a second extended position with respect to the second rail.

When the third rail 26 reaches a second extended position E2 after being displaced in the opening direction D1 with respect to the second rail 24 at the first extended position E1, referring to FIG. 28, the second elastic portion 60b of the base 60 releases the elastic force stored therein, and the second working member 54 is brought back to the first working state by the elastic force released and ends up at a second side of the blocking portion 46 to prevent the third rail 26 from being displaced with respect to the second rail 24 from the second extended position E2 in the retracting direction D2. On the other hand, the first working member 52 remains in the first working state and is at the first side of the blocking portion 46 to prevent the third rail 26 from being displaced with respect to the second rail 24 from the second extended position E2 in the opening direction D1.

Figure 29:
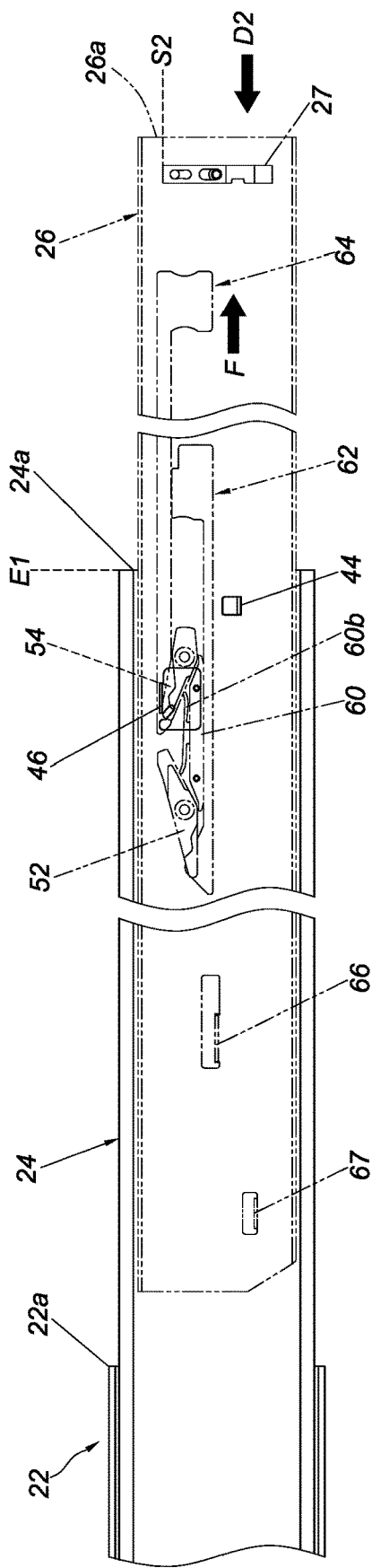
FIG. 29 is a schematic view of the slide rail assembly according to the embodiment of the present invention, showing that the third rail of the slide rail assembly is displaced in a retracting direction with respect to the second rail at the first extended position.

As shown in FIG. 28 and FIG. 29, the switching member 27 can be switched from the first state S1 to the second state S2 in order for the driving portion 27b of the switching member 27 to correspond in position to, rather than be offset from, the working feature 44 of the second rail 24 (see also FIG. 9). More specifically, a user can apply a force F to the second operating member 64 so that the second working member 54 is driven out of the first working state (e.g., into the second working state) by the second operating member 64, thereby allowing the third rail 26 to be displaced in the retracting direction D2 with respect to the second rail 24 at the first extended position E1 (see FIG. 29). It is worth mentioning that if it is desired to detach the third rail 26 from the second rail 24 while the third rail 26 is at the second extended position E2, the user can apply another force (hereinafter referred to as the second force) to the first operating member 62 in order for the first operating member 62 to drive the first working member 52 out of the first working state (e.g., into a second working state), thereby allowing the third rail 26 to be displaced in the opening direction D1 with respect to, and consequently detached from, the second rail 24 at the first extended position E1.

Referring to FIG. 30 and FIG. 31, when the third rail 26 reaches a certain retracted position after being displaced from the second extended position E2 in the retracting direction D2 with respect to the second rail 24 at the first extended position E1, the contact feature 66 of the third rail 26 can be used to drive the first engaging member 78 so that the extension leg 78c of the first engaging member 78 is no longer blocked by the position limiting portion 38 of the first auxiliary member 32 (see FIG. 31) and hence the second rail 24 can be displaced with respect to the first rail 22 from the first extended position E1 in the retracting direction D2. The second engaging member 84 is now spaced apart from the second auxiliary member 34 of the first rail 22. Preferably, the second auxiliary member 34 includes a guiding section 34a, wherein the guiding section 34a is, for example but not limited to, an inclined surface or a curved surface.

Figure 32:
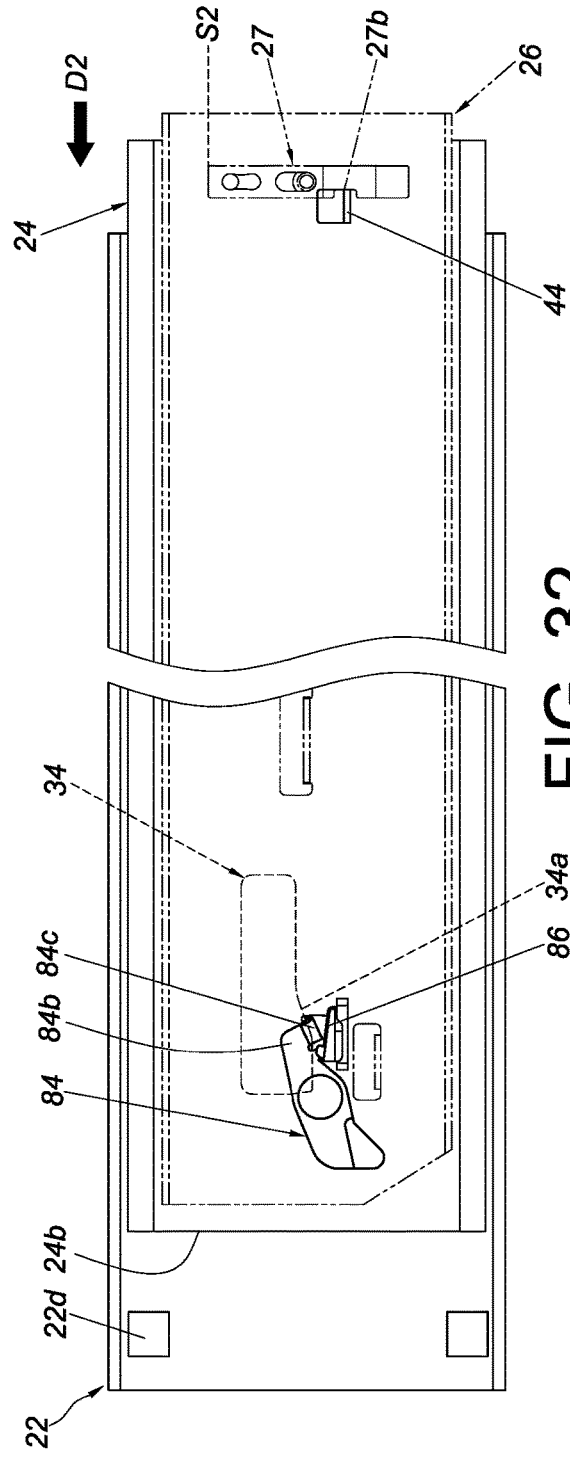
FIG. 32 is a schematic view of the slide rail assembly according to the embodiment of the present invention, showing that, with the switching member in the second state and pushing the working feature of the second rail, the third rail of the slide rail assembly displaces the second rail in the retracting direction, with the second rail displaced simultaneously with the third rail.
Figure 33:
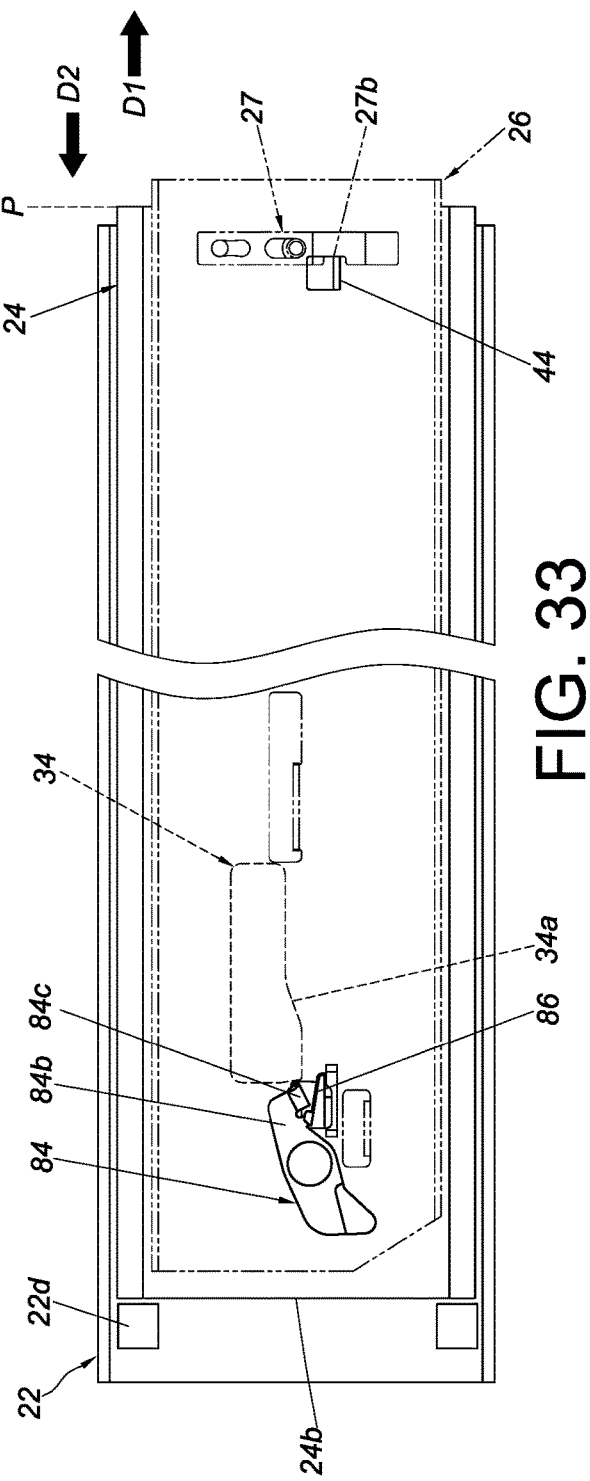
FIG. 33 is a schematic view of the slide rail assembly according to the embodiment of the present invention, showing that the second rail of the slide rail assembly reaches a predetermined position after being displaced by the third rail in the retracting direction.

Referring to FIG. 32 and FIG. 33, when the third rail 26 reaches a predetermined retracted position after being displaced from the second extended position E2 in the retracting direction D2, the driving portion 27b of the switching member 27 comes into contact with the working feature 44 of the second rail 24 such that the third rail 26 can displace the second rail 24 in the retracting direction D2 to the predetermined position P (see FIG. 33), with the second rail 24 displaced simultaneously with the third rail 26. In the course in which the second rail 24 is displaced in the retracting direction D2 to the predetermined position P, the extension leg 84c of the second engaging member 84 preferably comes into contact with the guiding section 34a of the second auxiliary member 34 of the first rail 22 such that the third elastic member 86 is subjected to a force applied by the second engaging member 84 and stores an elastic force (see FIG. 32) as a result. When the second rail 24 arrives at the predetermined position P (see FIG. 33), the extension leg 84c of the second engaging member 84 has moved past the guiding section 34a of the second auxiliary member 34, so the second engaging member 84 engages with the second auxiliary member 34 in response to the elastic force released by the third elastic member 86 and thus prevents the second rail 24 from being displaced with respect to the first rail 22 from the predetermined position P in the opening direction D1. It is worth mentioning that the first rail 22 has a rear blocking structure 22d for blocking the rear end portion 24b of the second rail 24 and thereby preventing the second rail 24 from being displaced with respect to the first rail 22 from the predetermined position P in the retracting direction D2.

Figure 34:
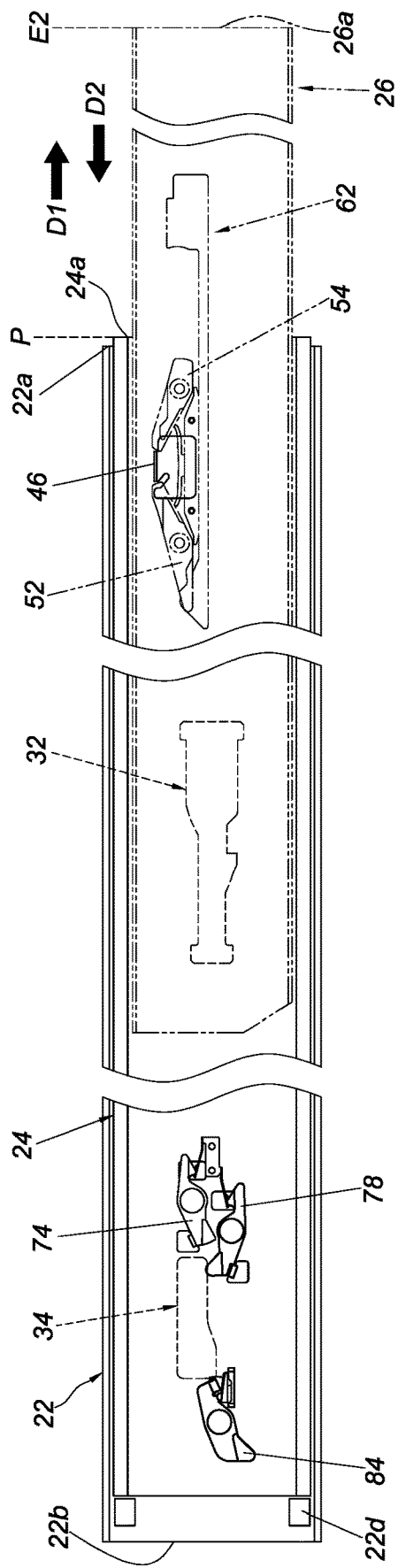
FIG. 34 is a schematic view of the slide rail assembly according to the embodiment of the present invention, showing that the third rail of the slide rail assembly reaches the second extended position after being displaced in the opening direction with respect to the second rail at the predetermined position.

When the second rail 24 is at the predetermined position P (e.g., a retracted position) with respect to the first rail 22, referring to FIG. 34, the third rail 26 can be displaced alone with respect to the second rail 24 in the opening direction D1, and once the third rail 26 reaches the second extended position E2, the first working member 52 and the second working member 54 (both in the first working state) are located at the two opposite sides of the blocking portion 46 of the second rail 24 respectively so that the third rail 26 is prevented from being displaced with respect to the second rail 24 from the second extended position E2 in either of the opening direction D1 and the retracting direction D2.

Figure 35:
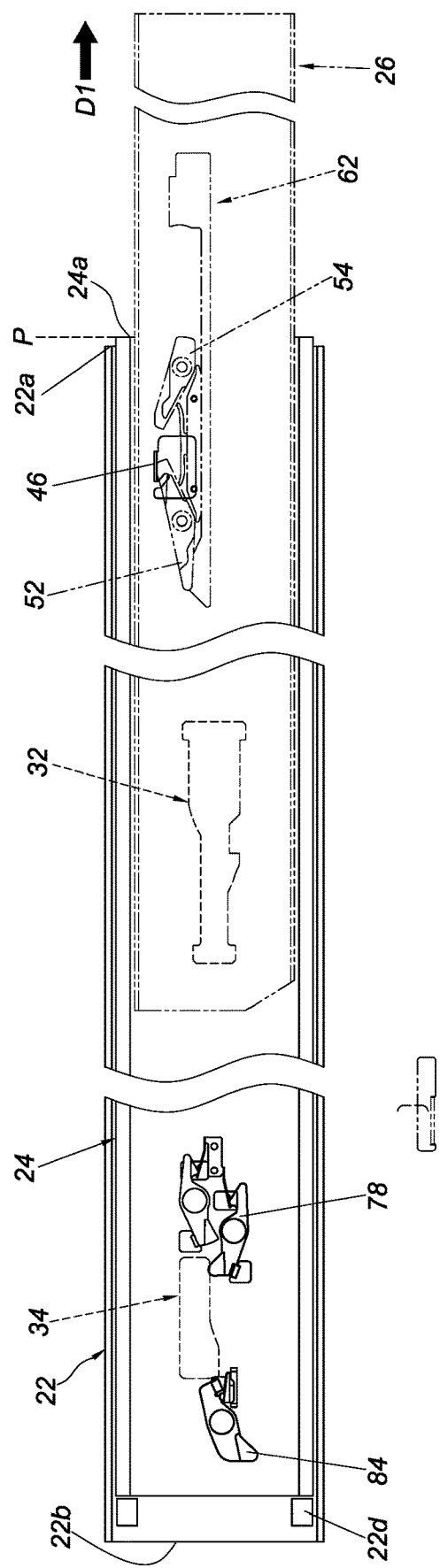
FIG. 35 is a schematic view of the slide rail assembly according to the embodiment of the present invention, showing that the third rail at the second extended position can be detached in the opening direction with respect to the second rail at the predetermined position.

When the third rail 26 is at the second extended position E2, referring to FIG. 35, a user can apply the aforesaid second force to the first operating member 62 in order for the first operating member 62 to drive the first working member 52 out of the first working state (e.g., into the second working state), thereby allowing the third rail 26 to be detached in the opening direction D1 with respect to the second rail 24 at the predetermined position P. Referring back to FIG. 33, it is worth mentioning that when there is no need to detach the third rail 26 and the second rail 24 is at the predetermined position P, the third rail 26 can be displaced in the retracting direction D2 instead of the opening direction D1, in order for the supporting feature 67 to contact the second engaging member 84 again and bring the second engaging member 84 out of engagement with the second auxiliary member 34 (see FIG. 11), thereby allowing the second rail 24 to be pulled out again.

Referring to FIG. 36, the third rail 26 can be used to carry an object 90. When the second rail 24 and the third rail 26 are respectively at the first extended position E1 and the second extended position E2 with respect to the first rail 22, the distance between the rear end portion 22b of the first rail 22 and the front end portion 26a of the third rail 26 is defined as a first extended length L1, and the slide rail assembly is in a first extended state (such as but not limited to a fully extended state). When the slide rail assembly is used in an environment with limited space and is in the first extended state, a first space Y1 exists between the slide rail assembly and an article 92 (e.g., a door, a wall, or an obstacle) in the environment. The first space Y1, however, may hinder maintenance of the slide rail assembly. For example, the first space Y1 may be so narrow that it is difficult, if not impossible, to detach the third rail 26 from the second rail 24.

In that case, referring to FIG. 37 and FIG. 38, the operation described above can be used to displace the second rail 24 with respect to the first rail 22 from the first extended position E1 to the predetermined position P in the retracting direction D2 (see FIG. 37) and thereby bring the second rail 24 into temporary engagement with the second auxiliary member 34 of the first rail 22 through the second engaging member 84 (see FIG. 33), the objective being to reduce the overall length of the slide rail assembly from the first extended length L1 to a second extended length L2, with the slide rail assembly ending up in a second extended state (such as but not limited to a semi-extended state). In the second extended state, there is a second space Y2 between the slide rail assembly and the article 92 in the environment, and the second space Y2 is larger than the first space Y1 such that a user or operator of the slide rail assembly is given more working space than in the first extended state and can therefore perform the required maintenance work on the slide rail assembly and/or the object 90 or detach the third rail 26 from the second rail 24 with ease.

This embodiment also provides an operation method for changing the extended length of a slide rail assembly, wherein the operation method has been disclosed above and, for the sake of brevity, will not be described repeatedly.

While the present invention has been disclosed through the foregoing embodiment, it should be understood that the embodiment is not intended to be restrictive of the scope of the invention. The scope of patent protection sought by the applicant is defined by the appended claims.

What is claimed is:

1. A slide rail assembly, comprising:
   a first rail, and a first auxiliary member disposed on the first rail, the first auxiliary member including a disengaging portion;
   a second rail longitudinally displaceable with respect to the first rail, the second rail including a synchronizing mechanism movably mounted thereon, wherein the second rail is provided with a working feature;
   a third rail longitudinally displaceable with respect to the second rail, the third rail including a contact feature; and
   a switching member configured to be operated and thereby switched between a first state and a second state;
   wherein the second rail is displaceable with respect to the first rail to a first extended position in an opening direction, and the third rail is displaceable with respect to the first rail to a second extended position in the opening direction;
   wherein by switching the switching member from the first state to the second state and displacing the third rail from the second extended position to a predetermined retracted position in a retracting direction, the switching member is brought into contact with the working feature of the second rail, the third rail thereby displaces the second rail to a predetermined position in the retracting direction, wherein the second rail is displaced simultaneously with the third rail;
   wherein the third rail is configured to push the synchronizing mechanism via the contact feature to thereby displace the second rail from the predetermined position in the opening direction, and the second rail being displaced simultaneously with the third rail; wherein when the second rail reaches a predetermined location after being displaced by, and simultaneously with, the third rail from the predetermined position in the opening direction, the disengaging portion of the first auxiliary member disengages the synchronizing mechanism from the contact feature; the synchronizing mechanism includes a synchronizing member and a first elastic member for applying an elastic force to the synchronizing member; and the third rail pushing the synchronizing member via the contact feature.

2. The slide rail assembly of claim 1, wherein the first auxiliary member further includes a position limiting portion; the slide rail assembly further comprises a first engaging mechanism movably mounted on the second rail; once the second rail is displaced to the first extended position, the first engaging mechanism is adjacent to the position limiting portion of the first auxiliary member to prevent the second rail from being displaced from the first extended position in the retracting direction; the first engaging mechanism includes a first engaging member and a second elastic member for applying an elastic force to the first engaging member; and when the second rail is at the first extended position, the first engaging member is adjacent to the position limiting portion of the first auxiliary member in response to the elastic force of the second elastic member.

3. The slide rail assembly of claim 2, wherein the second rail is movably mounted between the first rail and the third rail; the first rail has a front end portion and a rear end portion; the third rail has a front end portion and a rear end portion; the slide rail assembly further comprises a second engaging mechanism movably mounted on the second rail; when the second rail reaches the first extended position after being displaced with respect to the first rail from the predetermined position in the opening direction and the third rail reaches the second extended position after being displaced with respect to the second rail in the opening direction, the rear end portion of the first rail and the front end portion of the third rail define a first length therebetween; and when the second rail reaches the predetermined position after being displaced from the first extended position in the retracting direction, the first length between the rear end portion of the first rail and the front end portion of the third rail is reduced to a second length, and the second rail is kept at the predetermined position with respect to the first rail by the second engaging mechanism.

4. The slide rail assembly of claim 3, further comprising a second auxiliary member disposed on the first rail, wherein when the first length between the rear end portion of the first rail and the front end portion of the third rail is reduced to the second length, the second rail is engaged with the second auxiliary member via the second engaging mechanism to be prevented from being displaced from the predetermined position in the opening direction; the second engaging mechanism includes a second engaging member and a third elastic member for applying an elastic force to the second engaging member; and when the second rail is at the predetermined position, the second engaging member is engaged with the second auxiliary member in response to the elastic force of the third elastic member.

5. The slide rail assembly of claim 4, further comprising a supporting feature disposed on the third rail, wherein when the third rail is further displaced in the retracting direction, the supporting feature disengages the second engaging member from the second auxiliary member.

6. The slide rail assembly of claim 1, wherein the switching member includes a driving portion; the driving portion is offset in position from the working feature of the second rail when the switching member is in the first state; and once the switching member is switched from the first state to the second state, the driving portion is no longer offset in position from the working feature of the second rail such that when the third rail reaches the predetermined retracted position after being displaced from the second extended position in the retracting direction, the driving portion of the switching member contacts the working feature of the second rail.

7. The slide rail assembly of claim 6, wherein the switching member includes a main body portion, and there is a positional difference between the main body portion and the driving portion such that the main body portion of the switching member is kept from contact with the working feature of the second rail while the switching member is in the first state.

8. The slide rail assembly of claim 1, further comprising a first working member mounted on the third rail, wherein the first working member is switchable between a first working state and a second working state with respect to the third rail; the second rail is provided with a blocking portion; when the third rail is at the second extended position and the first working member is in the first working state, the first working member is located at one side of the blocking portion to prevent the third rail from being displaced in the opening direction with respect to the second rail at the first extended position; and once the first working member is operated and thereby switched from the first working state to the second working state, the third rail is allowed to be detached with respect to the second rail in the opening direction.

9. The slide rail assembly of claim 8, further comprising a second working member mounted on the third rail, wherein the second working member is switchable between a first working state and a second working state with respect to the third rail; when the third rail is at the second extended position and the second working member is in the first working state, the second working member is located at an opposite side of the blocking portion to prevent the third rail from being displaced in the retracting direction with respect to the second rail at the first extended position; and when the third rail is at the second extended position and the second working member is in the second working state, the third rail is displaceable in the retracting direction with respect to the second rail at the first extended position.

10. A slide rail assembly, comprising:
  a first rail, and a first auxiliary member disposed on the first rail, the first auxiliary member including a disengaging portion;
  a second rail displaceable with respect to the first rail, the second rail including a synchronizing mechanism movably mounted thereon, wherein the second rail is provided with a working feature;
  a third rail displaceable with respect to the second rail, the third rail including a contact feature; and
  a switching member disposed on the third rail;
  wherein the switching member is configured to contact the working feature of the second rail when the third rail reaches a predetermined retracted position after being displaced from an extended position in a retracting direction, thereby allowing the third rail to displace the second rail to a predetermined position in the retracting direction, with the second rail displaced simultaneously with the third rail;
  wherein the third rail is configured to push the synchronizing mechanism via the contact feature and thereby displace the second rail from the predetermined position in an opening direction, with the second rail displaced simultaneously with the third rail; and when the second rail reaches a predetermined location after being displaced by, and simultaneously with, the third rail from the predetermined position in the opening direction, the disengaging portion of the first auxiliary member disengages the synchronizing mechanism from the contact feature.

11. The slide rail assembly of claim 10, wherein the switching member includes a driving portion; the driving portion is offset in position from the working feature of the second rail when the switching member is in a first state; and once the switching member is switched from the first state to a second state, the driving portion is no longer offset in position from the working feature of the second rail such that when the third rail reaches the predetermined retracted position after being displaced from the extended position in the retracting direction, the driving portion of the switching member contacts the working feature of the second rail.

12. The slide rail assembly of claim 10, wherein the synchronizing mechanism includes a synchronizing member and a first elastic member for applying an elastic force to the synchronizing member, and the third rail is configured to push the synchronizing member via the contact feature.

13. The slide rail assembly of claim 10, wherein the first auxiliary member further includes a position limiting portion; the slide rail assembly further comprises a first engaging mechanism movably mounted on the second rail; once the second rail is displaced to another extended position, the first engaging mechanism is adjacent to the position limiting portion of the first auxiliary member to prevent the second rail from being displaced from said another extended position in the retracting direction; the first engaging mechanism includes a first engaging member and a second elastic member for applying an elastic force to the first engaging member; and when the second rail is at said another extended position, the first engaging member is adjacent to the position limiting portion of the first auxiliary member in response to the elastic force of the second elastic member.

14. The slide rail assembly of claim 13, wherein the second rail is movably mounted between the first rail and the third rail; the first rail has a front end portion and a rear end portion; the third rail has a front end portion and a rear end portion; the slide rail assembly further comprises a second engaging mechanism movably mounted on the second rail; when the second rail reaches another extended position after being displaced with respect to the first rail from the predetermined position in an opening direction and the third rail reaches the extended position after being displaced with respect to the second rail in the opening direction, the rear end portion of the first rail and the front end portion of the third rail define a first length therebetween; and when the second rail reaches the predetermined position after being displaced from said another extended position in the retracting direction, the first length between the rear end portion of the first rail and the front end portion of the third rail is reduced to a second length, and the second rail is kept at the predetermined position with respect to the first rail by the second engaging mechanism.

15. The slide rail assembly of claim 14, further comprising a second auxiliary member disposed on the first rail, wherein when the first length between the rear end portion of the first rail and the front end portion of the third rail is reduced to the second length, the second rail is engaged with the second auxiliary member via the second engaging mechanism and is thus prevented from being displaced from the predetermined position in the opening direction; the second engaging mechanism includes a second engaging member and a third elastic member for applying an elastic force to the second engaging member; and
when the second rail is at the predetermined position, the second engaging member is engaged with the second auxiliary member in response to the elastic force of the third elastic member.

16. A slide rail assembly, comprising:
a first rail;
a second rail longitudinally displaceable with respect to the first rail, the second rail being provided with a working feature, and the second rail being displaceable with respect to the first rail to a first extended position in an opening direction;
a third rail longitudinally displaceable with respect to the second rail, the third rail being displaceable with respect to the first rail to a second extended position in the opening direction;
a switching member configured to be operated and thereby switched between a first state and a second state, wherein by switching the switching member from the first state to the second state and displacing the third rail from the second extended position to a predetermined retracted position in a retracting direction, the switching member is brought into contact with the working feature of the second rail, the third rail thereby displaces the second rail to a predetermined position in the retracting direction, and the second rail being displaced simultaneously with the third rail;
a first working member mounted on the third rail, wherein the first working member is switchable between a first working state and a second working state with respect to the third rail; the second rail is provided with a blocking portion; when the third rail is at the second extended position and the first working member is in the first working state, the first working member is located at one side of the blocking portion to prevent the third rail from being displaced in the opening direction with respect to the second rail at the first extended position; and
once the first working member is operated and thereby switched from the first working state to the second working state, the third rail is allowed to be detached with respect to the second rail in the opening direction; and
a second working member mounted on the third rail, wherein the second working member is switchable between a first working state and a second working state with respect to the third rail; when the third rail is at the second extended position and the second working member is in the first working state, the second working member is located at an opposite side of the blocking portion to prevent the third rail from being displaced in the retracting direction with respect to the second rail at the first extended position; and when the third rail is at the second extended position and the second working member is in the second working state, the third rail is displaceable in the retracting direction with respect to the second rail at the first extended position.

* * * * *